(12) United States Patent
Lewin et al.

(10) Patent No.: US 7,577,867 B2
(45) Date of Patent: Aug. 18, 2009

(54) CROSS TAGGING TO DATA FOR CONSISTENT RECOVERY

(75) Inventors: Michael Lewin, Modi'in (IL); Yair Heller, Tel Aviv (IL); Ziv Kedem, Tel Aviv (IL); Shlomo Ahal, Tel Aviv (IL); Assaf Natanzon, Ramat Gan (IL); Evgeny Drukh, Rehovot (IL)

(73) Assignee: EMC Corporation, Hopkinton, MA (US)

( * ) Notice: Subject to any disclaimer, the term of this patent is extended or adjusted under 35 U.S.C. 154(b) by 533 days.

(21) Appl. No.: 11/356,920

(22) Filed: Feb. 17, 2006

(65) Prior Publication Data

US 2007/0220311 A1 Sep. 20, 2007

(51) Int. Cl.
*G06F 11/00* (2006.01)
(52) U.S. Cl. .................. 714/6; 714/5; 714/15; 714/18; 714/19; 714/42
(58) Field of Classification Search .................. 714/4, 714/5, 6, 15, 16, 18, 19, 20, 42
See application file for complete search history.

(56) References Cited

U.S. PATENT DOCUMENTS

| | | | | |
|---|---|---|---|---|
| 6,947,981 | B2 * | 9/2005 | Lubbers et al. | 714/6 |
| 7,111,197 | B2 * | 9/2006 | Kingsbury et al. | 714/19 |
| 7,139,927 | B2 * | 11/2006 | Park et al. | 714/4 |
| 7,328,373 | B2 * | 2/2008 | Kawamura et al. | 714/20 |
| 2005/0015663 | A1 * | 1/2005 | Armangau et al. | 714/15 |
| 2006/0117211 | A1 * | 6/2006 | Matsunami et al. | 714/4 |
| 2006/0212462 | A1 | 9/2006 | Heller | |

OTHER PUBLICATIONS

Michael Lewin, et al. "Methods And Apparatus For Point In Time Data Access And Recovery", U.S. Appl. No. 11/609,560, filed Dec. 12, 2006.
Shlomo Ahal, et al., "Methods And Apparatus For Multiple Point In Time Data Access", U.S. Appl. No. 11/609,561, filed Dec. 12, 2006.
Shlomo Ahal, et al, "Methods And Apparatus For Optimal Journaling For Continuous Data Replication", U.S. Appl. No. 11/536,215, filed Sep. 28, 2006.

(Continued)

*Primary Examiner*—Michael C Maskulinski
*Assistant Examiner*—Joseph D Manoskey
(74) *Attorney, Agent, or Firm*—Daly, Crowley, Mofford & Durkee, LLP

(57) ABSTRACT

A system for consistent data recovery, including a storage area network (SAN) of initiator nodes and target nodes, wherein initiator nodes issue I/O requests and target nodes respond to I/O requests, the SAN being represented logically as a plurality of consistency groups of nodes, G1, . . . , Gn, each consistency group representing at least one logical storage unit (LU), each LU acting as a target node within the SAN, at least one host device, each host device acting as an initiator within the SAN, each host device including a transmitter for issuing I/O requests to at least one LU, and each host device being associated with a host device agent, the host device agent including an interceptor for intercepting I/O requests issued by the host device, and a router for forwarding the intercepted I/O requests to a data protection appliance, a data protection appliance (DPA) acting as both an initiator node and a target node within the SAN.

46 Claims, 15 Drawing Sheets

OTHER PUBLICATIONS

Shlomo Ahal, et al, "Methods And Apparatus For Optimal Journaling For Continuous Data Replication", U.S. Appl. No. 11/536,233, filed Sep. 28, 2006.

Shlomo Ahal, et al, "Methods And Apparatus For Managing Data Flow In A Continuous Data Replication System Having Journaling", U.S. Appl. No. 11/536,160, filed Sep. 28, 2006.

* cited by examiner

CROSS TAGGING TO DATA FOR CONSISTENT RECOVERY

FIELD OF THE INVENTION

The present invention relates to data protection and disaster recovery and more specifically to tracking and managing storage systems with dynamically changing data.

BACKGROUND OF THE INVENTION

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational data on a periodic basis. Such systems suffer from several drawbacks. First, they require a system shutdown during backup, since the data being backed up cannot be used during the backup operation. Second, they limit the points in time to which the organization to recover. For example, if data is backed up on a daily basis, there may be several hours of lost data in the event of a disaster. Third, the data recovery process itself takes a long time.

Another conventional data protection system uses data replication, by creating a copy of the organization's data on a secondary backup storage system, and updating the backup occur with changes. The backup storage system may be situated in the same physical location as the production storage system, or in a physically remote location. Data replication systems generally operate either at the application level, or at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization data is unavailable, during a recovery, and (ii) enable recovery as close a possible to any specified point in time within a recent history.

Continuous data protection typically uses a technology referred to as "journaling", whereby a log is kept of changes made to the backup storage. During a recovery, the journal entries serve as successive "undo" information, enabling rollback of the backup storage to previous points in time. Journaling was first implemented in database systems, and was later extended to broader data protection.

Because of their complex and massive configurations, large enterprise data systems with multiple production sites are often protected by distributing data replication over multiple protection systems. Although each individual protection system serves to restore the data units that it replicates, the need often arises for restoring a consistent image across all of the enterprise data units. For example, many production sites may share common databases, and the need may arise for generating a consistent image of the databases across all sites.

Unless a single data protection system replicates all of the enterprise data, there is currently no solution for restoring a consistent image across the enterprise without having to shut down the production sites.

SUMMARY OF THE DESCRIPTION

The present invention concerns systems and methods for recovering a consistent image of a data processing application, where the data processing is performed across more than one node of a storage area network (SAN). The SAN includes a plurality of consistency groups, where each group is a logical representation of (i) at least one logical storage unit (LU) at a production site, (ii) at least one host device at the production site that accesses the LUs, (iii) a data protection appliance (DPA) at the production site, and (iv) a replication site including LUs, host devices and DPAs which are counterparts to those at the production site, used to replicate the production site data. The replication site DPA maintains a journal of write transactions to the production site LUs, which can be used to undo the transactions and thereby restore the production site LUs to an earlier state.

The present invention uses tags to mark specific points in time in a journal, and the replication DPA of each consistency group can rollback the production site LUs to the states they were in at the time of a tag. The present invention also uses protection agents that process I/O requests from host devices, and that quiesce (i.e., halt, pause) the host devices, by temporarily stopping returning acknowledgements to issued I/O requests.

By arranging for the host devices in the various consistency groups to quiesce and remain quiesced within a common time interval, be it a small time interval, the present invention is able to cross tag the consistency groups in an overall consistent manner. By rolling back the source storage systems to their states at the times of the cross tags, a consistent image across all consistency groups is recovered.

As such, the present invention is able to overcome limitations of prior art data protection systems, especially those used for large enterprises, and to obtain a consistent image of all enterprise data units, without requiring shut down of production sites, or even interruption of production site data processing, while maintaining continuous data protection.

There is thus provided in accordance with a preferred embodiment of the present invention a system for consistent data recovery, including a storage area network (SAN) of initiator nodes and target nodes, wherein initiator nodes issue I/O requests and target nodes respond to I/O requests, the SAN being represented logically as a plurality of consistency groups of nodes, G1, . . . , Gn, each consistency group representing at least one logical storage unit (LU), each LU acting as a target node within the SAN, at least one host device, each host device acting as an initiator within the SAN, each host device including a transmitter for issuing I/O requests to at least one LU, and each host device being associated with a host device agent, the host device agent including an interceptor for intercepting I/O requests issued by the host device, and a router for forwarding the intercepted I/O requests to a data protection appliance, a data protection appliance (DPA) acting as both an initiator node and a target node within the SAN, the DPA including a receiver for receiving a current I/O request forwarded by an agent router for a host device, a router for forwarding the current I/O request to a replication facility, an ACK transmitter for sending an acknowledgement for an I/O request to an agent, wherein the agent router is operable to halt forwarding further host device I/O requests until the acknowledgement for a current I/O request is received from the DPA, and to resume forwarding after the acknowledgement for the current I/O request is received; and a tag initiator for issuing an instruction for the replication facility to tag a consistency group at a current point in time, and a replication facility including a receiver for receiving I/O requests forwarded by the DPA router, and a data recoverer for restoring the LUs to a tagged state, based on I/O requests received by the DPA receiver, the system further including a DPA manager operable to send requests to the DPAs of G1, ..., Gn, (r1) to stop their ACK transmitters sending acknowledgements for I/O requests to the host device agents of G1, ..., Gn, and (r2) to tag G1, ..., Gn.

There is further provided in accordance with a preferred embodiment of the present invention a method for consistent data recovery, including issuing requests from a data protection appliance (DPA) manager to at least one DPA within at least one consistency group, G1, ..., Gn, (r1) to stop sending acknowledgements of I/O requests to host device agents of G1, ..., Gn, and (r2) to tag G1, ..., Gn, wherein a tag is used to mark a consistency group at a specific point in time, wherein the consistency groups G1, ..., Gn represent logical parts of a storage area network, and each consistency group G1, ..., Gn represents a DPA, at least one host device, at least one LU and at least one replication facility, the replication facility being operable to restore the at least one LU to its former state at the time of the tag, and wherein each host device is associated with a host device controller that is operable to forward the host device I/O requests, halt such forwarding when it does not receive an acknowledgement of a current I/O request from a DPA, and resume such forwarding after it does receive an acknowledgement of the current I/O request from the DPA.

There is yet further provided in accordance with a preferred embodiment of the present invention a computer-readable storage medium storing program code for causing a data protection appliance (DPA) manager to issue requests to at least one DPA within at least one other consistency group, G1, ..., Gn, (r1) to stop sending acknowledgements of I/O requests to host device agents of G1, ..., Gn, and (r2) to tag G1, ..., Gn, wherein a tag is used to mark a consistency group at a specific point in time, wherein the consistency groups G1, ..., Gn represent logical parts of a storage area network, and each consistency group G1, ..., Gn represents a DPA, at least one host device, at least one LU and at least one replication facility, the replication facility being operable to restore the at least one LU to its former state at the time of the tag, and wherein each host device is associated with a host device agent that is operable to forward the host device I/O requests, halt such forwarding when it does not receive an acknowledgement of a current I/O request from a DPA, and resume such forwarding after it does receive an acknowledgement of the current I/O request from the DPA.

There is additionally provided in accordance with a preferred embodiment of the present invention a system for data protection, including a network represented logically as a plurality of consistency groups, G1, ..., Gn, each consistency group representing at least one host device for issuing I/O requests, and each host device being associated with a host device controller for processing I/O requests issued by the host device, a data protection appliance (DPA), communicating with the at least one host device, including a quiesce controller operable to cause the at least one host device controller to halt processing I/O requests and to cause the at least one host device controller to resume processing I/O requests, and a tag initiator for marking a specific consistency group at a specific point in time, the system further including a DPA manager operable to send requests to the DPAs of G1, ..., Gn, (r1) via their quiesce controllers, to cause the host device controllers of G1, ..., Gn to halt processing I/O requests, and (r2) to initiate tags in G1, ..., Gn.

There is moreover provided in accordance with a preferred embodiment of the present invention a method for data protection, including issuing requests from a data protection appliance (DPA) manager, to at least one DPA within at least one consistency group, G1, ..., Gn, the request including (r1) to cause host device controllers of G1, ..., Gn to halt processing I/O requests, and (r2) to initiate tags in G1, ..., Gn, wherein a tag is used to mark a consistency group at a specific point in time, wherein the consistency groups G1, ..., Gn represent logical parts of a network, and each consistency group G1, ..., Gn represents a DPA and at least one host device, and wherein each host device is associated with a host device controller that processes the host device I/O requests, and that can halt such processing and that can resume such processing.

There is further provided in accordance with a preferred embodiment of the present invention a computer-readable storage medium storing program code for causing a data protection appliance (DPA) manager to issue requests to at least one DPA within at least one consistency group, G1, ..., Gn, the requests including (r1) to cause host device controllers of G1, ..., Gn to halt processing I/O requests, and (r2) to initiate tags in G1, ..., Gn, wherein a tag is used to mark a consistency group at a specific point in time, wherein the consistency groups G1, ..., Gn represent logical parts of a network, and each consistency group G1, ..., Gn represents a DPA and at least one host device, and wherein each host device is associated with a host device controller that processes the host device I/O requests, and that can halt such processing and that can resume such processing.

There is yet further provided in accordance with a preferred embodiment of the present invention a system for data recovery to a crash consistent state of data of a plurality of consistency groups stored in a storage sub-system, including a storage area network (SAN) of initiator nodes and target nodes, wherein initiator nodes issue I/O requests and target nodes respond to I/O requests, the SAN including at least one storage subsystem acting as a SAN target node, including at least one addressable physical storage unit; and at least one controller operable to provide access to data stored in the at least one addressable physical storage unit, to at least one host acting as a SAN initiator node through at least one logical storage unit (LU), each LU having an identifier, and at least one host acting as a SAN initiator node, operable to issue I/O requests to the at least one LU through at least one host device, each host device having an identifier at least one data processing unit, each data processing unit including a receiver for receiving I/O requests issued by at least one host to at least one LU, a router for forwarding a current I/O request to a data protection facility, and a transmitter for sending an acknowledgement for an I/O request to a host device of the at least one host, wherein each of the at least one host is operable to halt processing further I/O requests through a host device until the acknowledgement is received from the data processing unit for a current I/O request, and to resume processing I/O requests through a host device after the acknowledgement is received, at least one consistency group, each consistency group being a logical entity including an identifier, at least one of the LU identifiers, and at least one of the host device identifiers, a tag initiator for issuing an instruction for the data protection facility to store a consistency group identifier and a tag identifier, and a data protection facility including a receiver for receiving I/O requests forwarded by the at least one router, and a journal processor for storing write I/O requests issued to at least one LU, each write I/O request including an identifier of the LU to which the I/O request was issued and an identifier of the sequential order of the write request, and a data recoverer for processing the data stored by the journal processor and the data stored in the at least one LU, or a copy thereof, so to enable at least one SAN initiator node to process the at least one LU, or a copy thereof, in a state it was in at at least one point in time in the past, wherein one of the data processing units of the system further includes a data protection manager operable to send requests, via the transmitter, to at least one data processing unit, (r1) to halt host devices of at least one consistency group handled by that data processing unit, and (r2) to tag a consistency group.

The following definitions are employed throughout the specification and claims.

BACKUP SITE—a facility where replicated production site data is stored; the backup site may be located in a remote site or at the same location as the production site;

CONSISTENCY GROUP—a basic logical entity for which data protection services, such as replication, tagging and journaling, are provided by a DPA; a consistency group includes (i) at least one logical storage unit for a source side storage system that is to be protected, (ii) corresponding logical units for a backup site, and (iii) at least one logical unit used for journaling at the backup site;

DPA—a computer or a cluster of computers that serve as a data protection appliance, responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGICAL UNIT—a logical entity provided by a storage system for accessing data from the storage system;

LUN—a logical unit number for identifying a logical unit;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side;

WAN—a wide area network that connects local networks and enables them to communicate with one another, such as the Internet.

A system for consistent data recovery, including a storage area network (SAN) of initiator nodes and target nodes, wherein initiator nodes issue I/O requests and target nodes respond to I/O requests, the SAN being represented logically as a plurality of consistency groups of nodes, G1, ..., Gn, each consistency group representing at least one logical storage unit (LU), each LU acting as a target node within the SAN, at least one host device, each host device acting as an initiator within the SAN, each host device including a transmitter for issuing I/O requests to at least one LU, and each host device being associated with a host device agent, the host device agent including an interceptor for intercepting I/O requests issued by the host device, and a router for forwarding the intercepted I/O requests to a data protection appliance, a data protection appliance (DPA) acting as both an initiator node and a target node within the SAN, the DPA including a receiver for receiving a current I/O request forwarded by an agent router for a host device, a router for forwarding the current I/O request to a replication facility, an ACK transmitter for sending an acknowledgement for an I/O request to an agent, wherein the agent router is operable to halt forwarding further host device I/O requests until the acknowledgement for a current I/O request is received from the DPA, and to resume forwarding after the acknowledgement for the current I/O request is received; and a tag initiator for issuing an instruction for the replication facility to tag a consistency group at a current point in time, and a replication facility including a receiver for receiving I/O requests forwarded by the DPA router, and a data recoverer for restoring the LUs to a tagged state, based on I/O requests received by the DPA receiver, the system further including a DPA manager operable to send requests to the DPAs of G1, ..., Gn, (r1) to stop their ACK transmitters sending acknowledgements for I/O requests to the host device agents of G1, ..., Gn, and (r2) to tag G1, ..., Gn. A method and a computer-readable storage medium are also described and claimed.

BRIEF DESCRIPTION OF THE DRAWINGS

The present invention will be more fully understood and appreciated from the following detailed description, taken in conjunction with the drawings in which.

DETAILED DESCRIPTION

The present invention concerns systems and methods for achieving consistent data recovery across multiple data replication systems. The present invention makes novel use of timed quiescing to control host applications so that they all quiesce (i.e., pause, halt), and remain quiesced within a common time interval. Such a common time interval exists when one host application does not un-quiesce (i.e., resume, unhalt) before another one quiesces. The present invention also makes use of tagging to mark journals prior to expiration of such common time interval, even if the time interval is very short, thereby ensuring that the tags are consistent with one another.

As such, the present invention is able to obtain a consistent image of all enterprise data units, without requiring shut down of production sites, or interruption of production site data processing.

Figure 1:
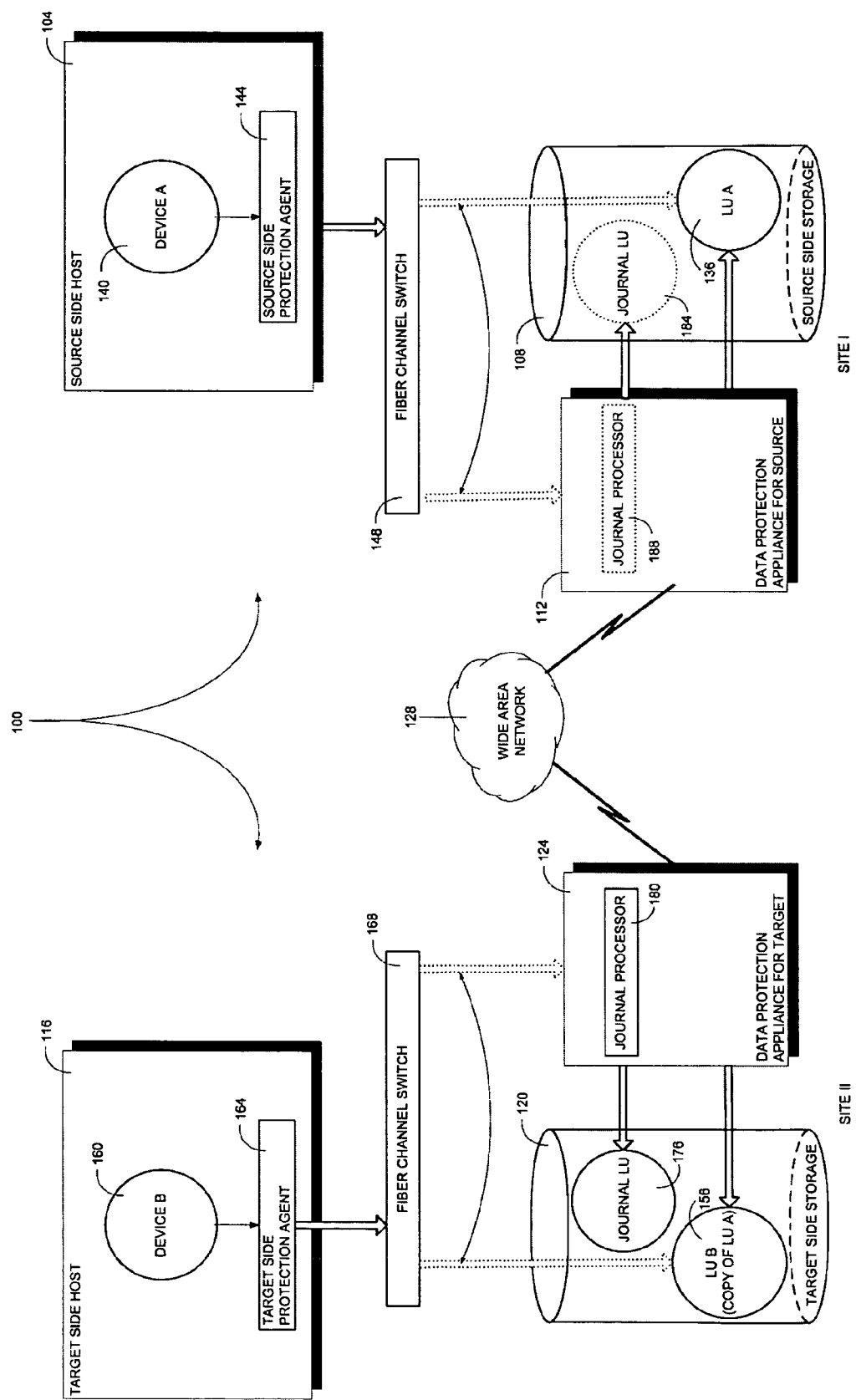
FIG. 1 is a simplified block diagram of a data protection system, in accordance with a preferred embodiment of the present invention.

Reference is now made to FIG. 1, which is a simplified illustration of a data protection system 100, in accordance with a preferred embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advance of minimizing data lag between target and source, but remote data protection has the advantage is being robust in the event that a disaster occurs at the source side.

The source and target sides communicate via a wide area network (WAN) 128, although other types of networks are also adaptable for use with the present invention.

In accordance with a preferred embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able t reply to requests, such as SCSI commands, sent by an initiator node. A SAN may also include network switches, such a fiber channel switches. The communication links between each host computer and its corresponding storage system may be any appropriate medium suitable for data transfer, such as fiber communication channel links.

In a preferred embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In a preferred embodiment of the present invention, storage system 108 exposes a logical unit 136, designated as LU A, and storage system 120 exposes a logical unit 156, designated as LU B.

In a preferred embodiment of the present invention, LU B is preferably used for replicating LU A. As such, LU B is generated as a copy of LU A. LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In a preferred embodiment of the present invention, host device 104 identifies LU A and generates a corresponding host device 140, designated as Device A, through which it can access LU A. Similarly, host computer 116 identifies LU B and generates a corresponding device 160, designated as Device B.

In a preferred embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

Preferably, for additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. Preferably, one computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with a preferred embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with a preferred embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with a preferred embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In a preferred embodiment of the present invention, protection agents communicate with their respective DPAs by sending SCSI commands over fiber channel.

In a preferred embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with a preferred embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A.

Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with a preferred embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with a preferred embodiment of the present invention, target storage system 120 exposes a logical unit 176, referred to as a "journal LU", for maintaining a history of write transactions made to LU B. referred to as a "journal". Alternatively, journal LU 176 may be striped over several logical units, or may reside within all of or a portion of another logical unit. Preferably, DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
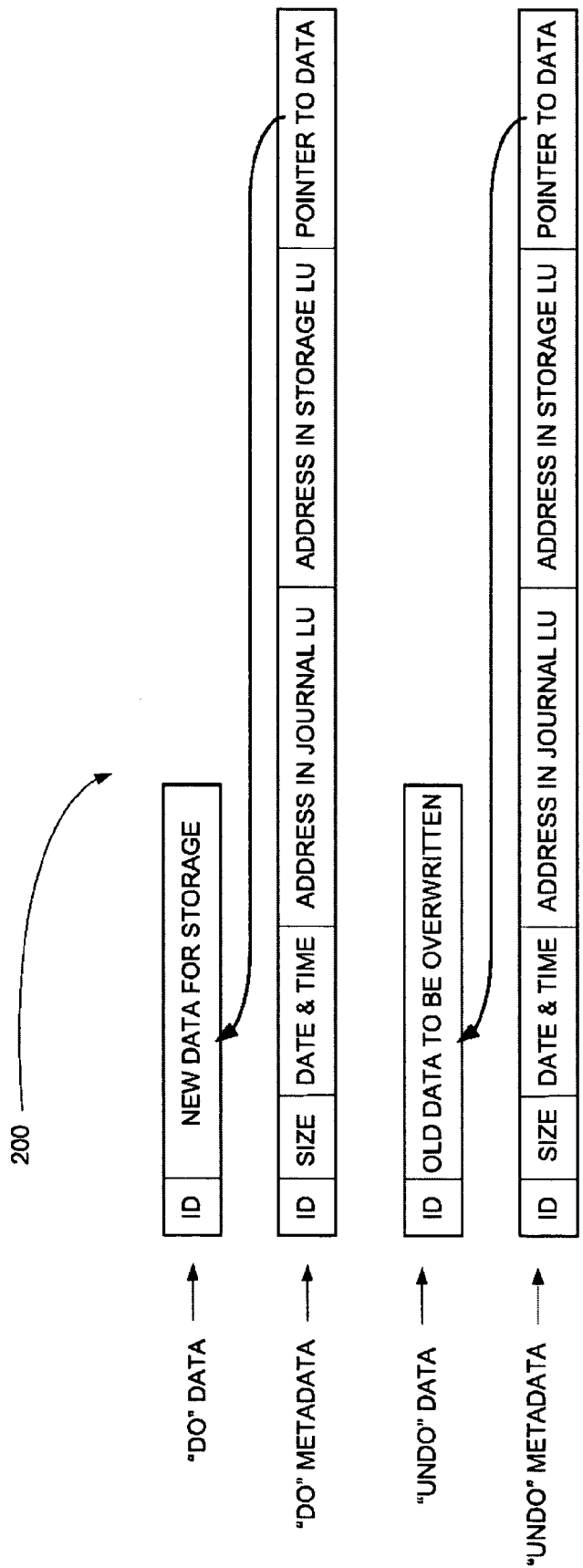
FIG. 2 is a simplified illustration of a journal history of write transactions for a storage system, in accordance with a preferred embodiment of the present invention.

Reference is now made to FIG. 2, which is a simplified illustration of a write transaction 200 for a journal, in accordance with a preferred embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 preferably records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is preferably partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

When a write transaction is received, journaling is thus advanced as indicated in TABLE I below.

TABLE I

Entering a write transaction in the journal

| | |
|---|---|
| Step 1 | The new data is written at the end of the DO stream, assuming a forward write direction, and corresponding metadata is written at the end of the DO METADATA stream. |
| Step 2 | Data is read from the beginning of the DO stream, and corresponding metadata is read from the beginning of the DO METADATA stream. |
| Step 3 | Old data to be overwritten is read from LU B. The location and size of such old data is determined from the DO METADATA stream. |
| Step 4 | The old data is written at the end of the UNDO stream, and corresponding metadata is written at the end of the UNDO METADATA stream. |
| Step 5 | The new data read at Step 2 is written into LU B, and the beginning and end pointers of the DO and DO METADATA streams are moved appropriately. |

Conversely, during a rollback to undo a write transaction, the above operations are reversed, as indicated in TABLE II below.

TABLE II

Undoing a write transaction in the journal

| | |
|---|---|
| Step 1 | Read the data and metadata from the end of the UNDO and UNDO METADATA streams. |
| Step 2 | Read from LU B the data that is to be overwritten. The location and size of such data is determined from the UNDO METADATA stream. |
| Step 3 | Write the data from Step 2 at the beginning of the DO stream, and update the DO METADATA stream accordingly. |
| Step 4 | Write the data from Step 1 to LU B, and update the beginning and end pointers of the UNDO and UNDO metadata streams appropriately. |

The following example, in conjunction with FIGS. 3A-3D, describes specific details of the journaling process, in accordance with a preferred embodiment of the present invention. A journal volume includes a plurality of segments from a segment pool, each segment including 20 data blocks.

Three write transactions are received, as indicated in TABLE III.

TABLE III

Example Write Transactions

| Write ID | Time | LU B location | Length | Journal LU location |
|---|---|---|---|---|
| 1 | 12/03/05 10:00:00.00 | LU B offset 57 blocks | 15 blocks | Segment 1, offset 0 |
| 2 | 12/03/05 10:00:00.05 | LU B offset 87 blocks | 20 blocks | Segment 1, offset 15 |
| 3 | 12/03/05 10:00:00.18 | LU B offset 12 blocks | 20 blocks | Segment 3, Offset 15 |

The following discussion describes four stages of journaling and data storage; namely, Stage #1: Enter the three write transactions as journal entries in the journal LU.
Stage #2: Apply the first write transaction to LU B.
Stage #3: Apply the second write transaction to LU B.
Stage #4: Rollback the second write transaction, to recover data from an earlier point in time.

The write transaction with ID=1 is written to the first 15 blocks of Segment #1. The metadata corresponding to this transaction is written to the first block of Segment #2. The second write transaction with ID=2 is written to the last 5 blocks of Segment #1 and the first 15 blocks of Segment #3. The metadata corresponding to this transaction is written to the second block of Segment #2. The third write transaction with ID=3 is written to the last 5 blocks of Segment #3 and the first 15 blocks of Segment #4. The metadata corresponding to this transaction is written to the third block of Segment #2.

Figure 3A:
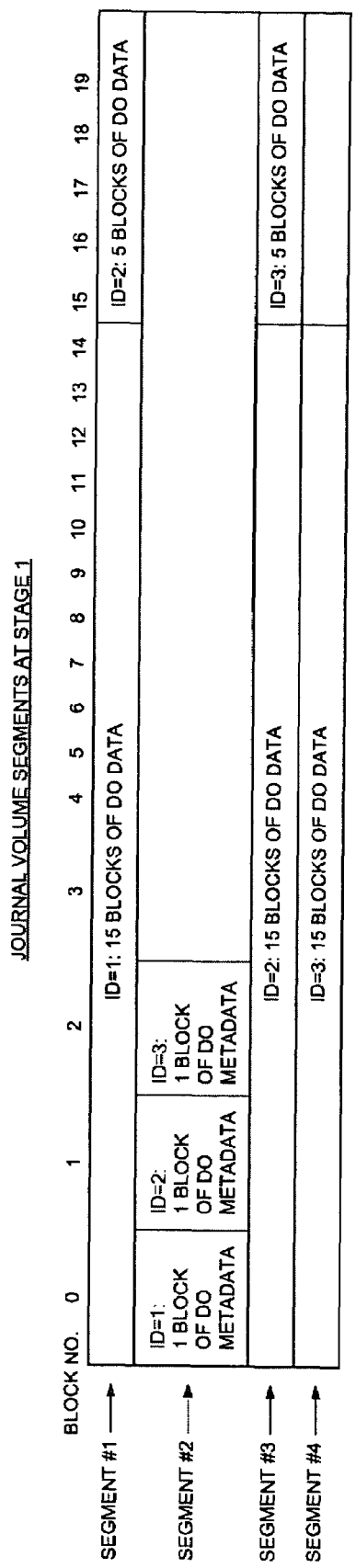
FIG. 3A is a simplified illustration of a first stage of a journal and four data streams stored therein, after recording three write transactions, in accordance with a preferred embodiment of the present invention.

Thus at stage #1, the DO stream in memory includes a list of segments 1, 3, 4; and a beginning pointer to offset=0 in Segment #1 and an end pointer to offset=10 in Segment #4. The DO METADATA stream in memory includes a list of one segment, namely Segment #2; and a beginning pointer to offset=0 in Segment #2 and an end pointer to offset=3 in Segment #2. The UNDO stream and the UNDO METADATA stream are empty. The journal and the four streams at the end of stage #1 are illustrated in FIG. 3A.

At stage #2 the write transaction with ID=1 is applied to LU B. New data to be written is read from the journal LU at the offset and length indicated in the DO METADATA; namely, 15 blocks of data located in blocks 0-14 of journal volume Segment #1. Correspondingly, old data is read from LU B at the offset and length indicated in the UNDO METADATA; namely, 15 blocks of data located in blocks 57-71 of LU B. The old data is then written into the UNDO stream in the journal LU, and the associated metadata is written into the UNDO METADATA stream in the journal LU. Specifically, for this example, the UNDO data is written into the first 15 blocks of Segment #5, and the UNDO METADATA is written into the first block of Segment #6. The beginning pointer of the UNDO data stream is set to offset=0 in Segment #5, and the end pointer is set to offset=15 in Segment #5. Similarly, the beginning pointer of the UNDO METADATA stream is set to offset=0 on Segment #6, and the end pointer is set to offset=1 in Segment #6.

Figure 3B:
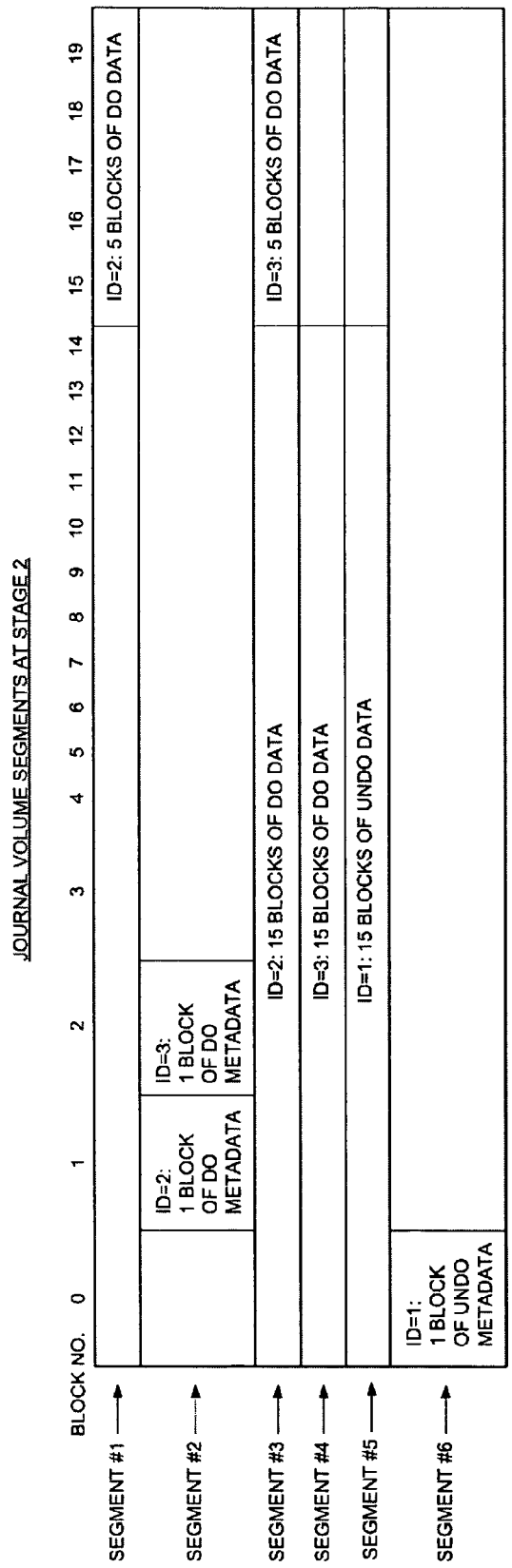
FIG. 3B is a simplified illustration of a second stage of a journal and four data streams stored therein, after applying a first write transactions to a storage system, in accordance with a preferred embodiment of the present invention.

At this point, the new data that was read from blocks 0-14 of journal LU Segment #1 is written to blocks 57-71 of LU B. The beginning pointer for the DO stream is moved forward to block 15 of journal LU Segment #1, and the beginning pointer for the DO METADATA stream is moved forward to block 1 of journal LU Segment #2. The journal and the four streams at the end of stage #2 are illustrated in FIG. 3B.

At stage #3 the write transaction with ID=2 is applied to the storage system. As above, 20 blocks of new data are read from blocks 15-19 of journal LU Segment #1 and from blocks 0-14 of journal LU Segment #3. Similarly, 20 blocks of old data are read from blocks 87-106 of LU B. The old data is written to the UNDO stream in the last 5 blocks of journal LU Segment #5 and the first 15 blocks of journal LU Segment #7. The associated metadata is written to the UNDO METADATA stream in the second block of Segment #6. The list of segments in the UNDO stream includes Segment #5 and Segment #7. The end pointer of the UNDO stream is moved to block 15 of Segment #7, and the end pointed of the UNDO METADATA stream is moved to block 2 of Segment #6.

Figure 3C:
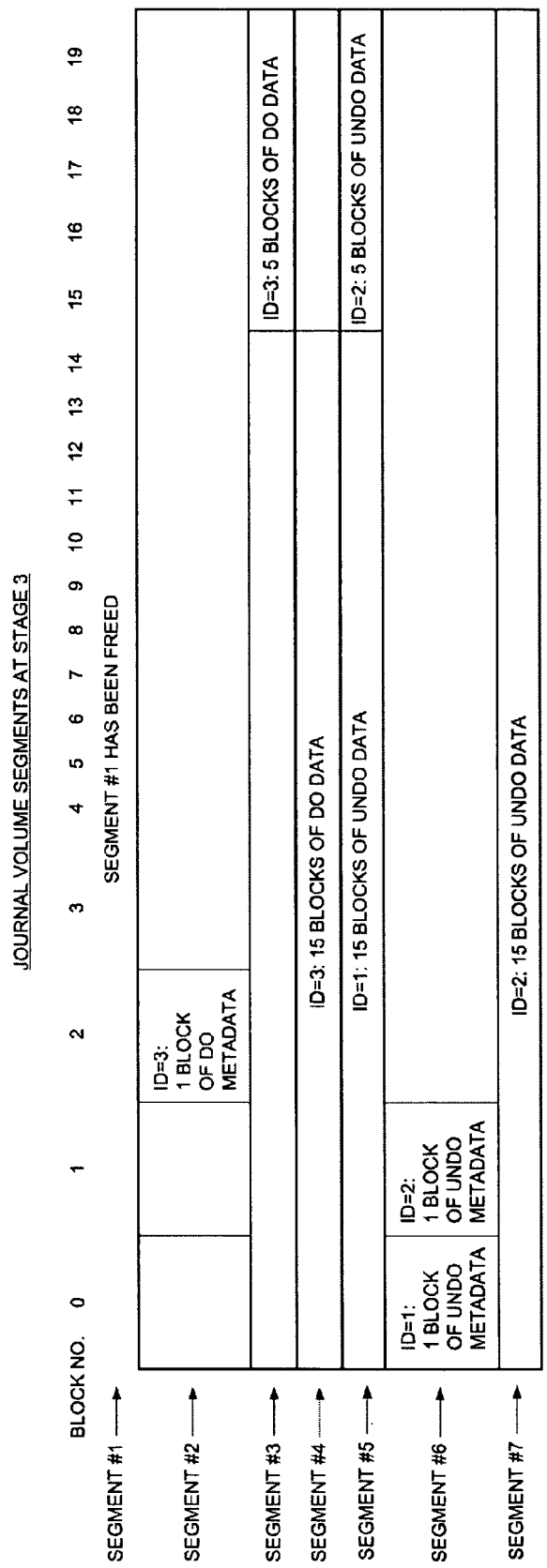
FIG. 3C is a simplified illustration of a third stage of a journal history and four data streams stored therein, after applying a second write transactions to a storage system, in accordance with a preferred embodiment of the present invention.

Finally, the new data from blocks 15-19 of journal LU Segment #1 and blocks 0-14 of journal LU Segment #3 is written into blocks 87-106 of LU B. The beginning pointer for the DO stream is moved forward to block 15 of journal volume Segment #3, and the beginning pointer for the DO METADATA stream is moved forward to block 2 of journal LU Segment #2. Segment #1 is freed from the DO stream, for recycling within the segment pool, and the list of segments for the DO stream is changed to Segment #3 and Segment #4. The journal and the four streams at the end of stage #3 are illustrated in FIG. 3C.

At stage #4 a rollback to time 10:00:00.00 is performed. Since the write transaction with ID=3 was not applied yet, the only write transaction to be undone is the write transaction with ID=2. The last entry is read from the UNDO METADATA stream, the location of the end of the UNDO METADATA stream being determined by its end pointer. I.e., the metadata before block 2 of journal LU Segment #6 is read, indicating two areas each of 20 blocks; namely, (a) the last 5 blocks of journal LU Segment #5 and the first 15 blocks of journal LU Segment #7, and (b) blocks 87-106 of LU B. Area (a) is part of the UNDO stream.

The 20 blocks of data from area (b) are read from LU B and written to the beginning of the DO stream. As the beginning pointer of the DO stream is set to offset=15 of journal LU Segment #3, 5 blocks are written at the end of Segment #3, and the remaining 15 blocks are written to Segment #8. The end pointer for the DO stream is set to block 15 of Segment #8. The list of segments for the DO stream is changed to Segment #3, Segment #4 and Segment #8. The metadata associated with the 20 blocks from area (b) is written to block 3 of Segment #2, and the end pointer of the DO METADATA stream is advanced to block 4 of Segment #2.

Figure 3D:
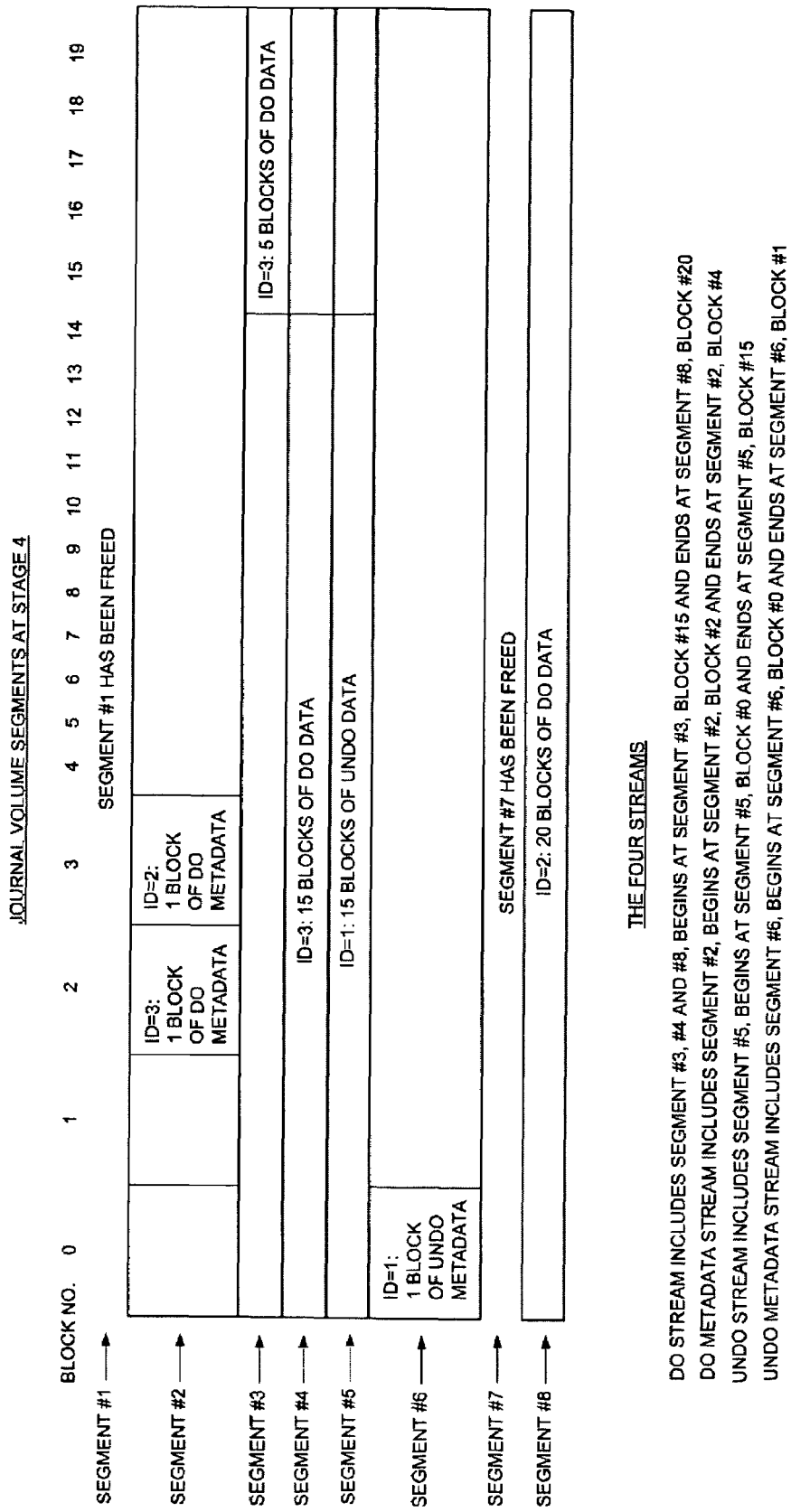
FIG. 3D is a simplified illustration of a fourth stage of a journal history and four data streams stored therein, after rolling back a write transaction, in accordance with a preferred embodiment of the present invention.

The 20 blocks of data in area (a) of the journal LU are then written to area (b) of the LU B. Finally, Segment #7 is freed for recycling in the segment pool, the UNDO stream ending pointer is moved back to Segment #5 of the journal LU, block 15, and the UNDO METADATA stream ending pointed is moved back to Segment #6 of the journal LU, block 1. The journal and the four streams at the end of stage #4 are illustrated in FIG. 3D.

Thus it may be appreciated that the journal is thus used to rollback LU B to the state that it was in at a previous point in time. The journal is also used to selectively access data from LU B at such previous point in time, without necessarily performing a rollback. Selective access is useful for correcting one or more files that are currently corrupt, or for simply accessing old data.

Figure 4:
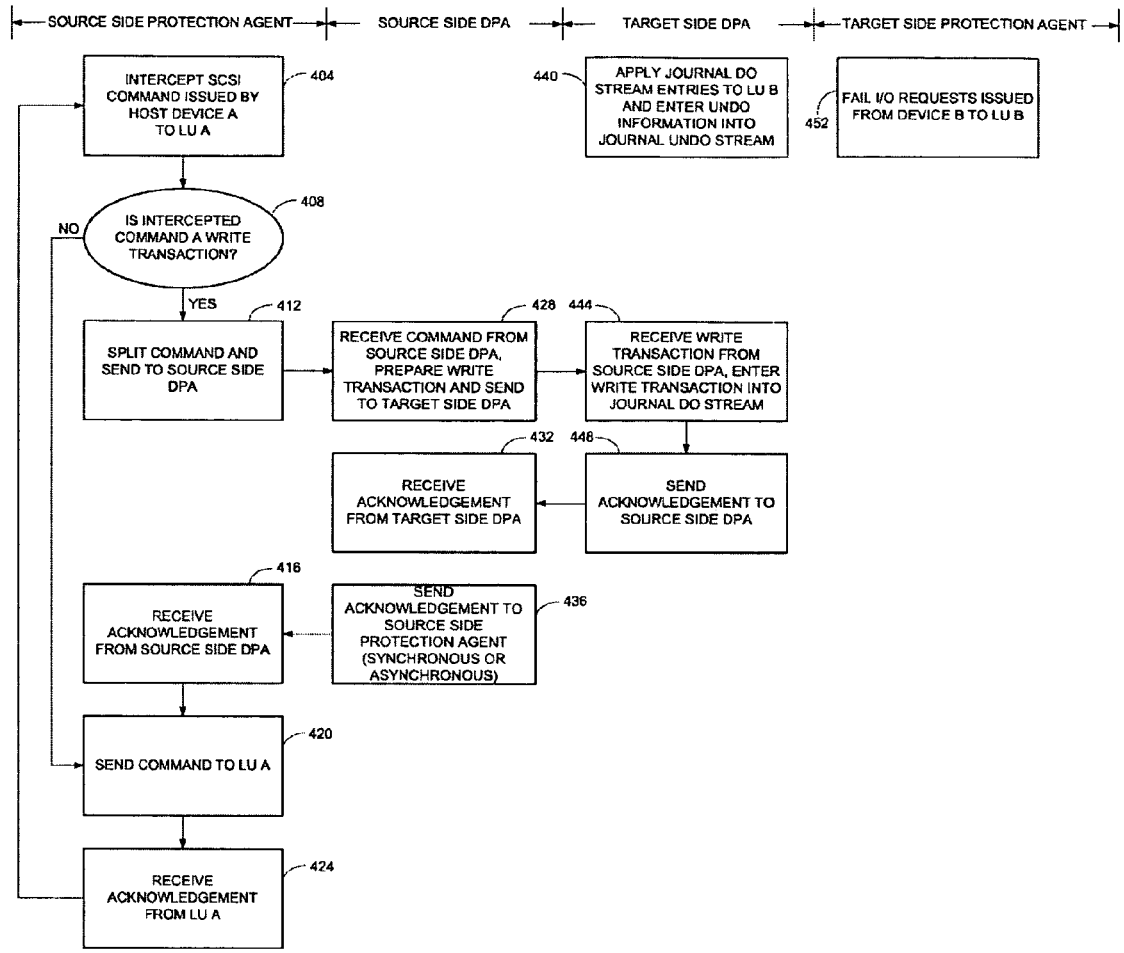
FIG. 4 is a simplified flowchart of a data protection method during a normal production mode, in accordance with a preferred embodiment of the present invention.

TABLE IV below summarizes the behavior of the special protection components of system 100 during production mode. Reference is also made to FIG. 4, which is a simplified flowchart of a data protection method corresponding to TABLE IV. FIG. 4 is divided into four columns. The leftmost column indicates steps performed by source side protection agent 112, the middle left column indicates steps performed by source side DPA 144, the middle right column indicates steps performed by target side DPA 124, and the rightmost column indicates steps performed by target side protection agent 164.

TABLE IV

Normal Production Mode Functionality

| System Component | Behavior |
| --- | --- |
| Source Side Agent 144 | Intercept SCSI commands issued to LU A by source side host via Device A (step 404). Replicate write commands, and route write commands to DPA (steps 408 and 412). Wait for first acknowledgement, from DPA (step 416), and then route replicate I/O command to LU A (step 420). Wait for second acknowledgement, from storage system (step 424), and then process next intercepted SCSI command (step 404). |
| Source Side DPA 112 | Receive write command from agent (step 428). Format write command as write transaction, and send to target DPA (step 428). In synchronous mode, wait for acknowledgement from target DPA (step 432), and then send acknowledgement to agent (step 436). In asynchronous mode and in snapshot mode, send acknowledgement to agent without waiting for acknowledgement from target DPA (step 436). |
| Target Side DPA 124 | Receive write transaction from source DPA (step 444). Enter write transaction in journal DO and DO METADATA streams (step 444), and send back acknowledgement to source DPA (step 448). Process journal entries by applying them to LU B, and enter undo information in UNDO and UNDO METADATA streams (step 440). |
| Target Side Agent 164 | Fail SCSI commands issued to LU B (step 452). |

Only steps with arrows connecting them in FIG. 4 are necessarily sequential. Thus steps 432 and 436, which do not have arrows connecting them, are not necessarily sequential. In synchronous mode these steps are sequential, but in asynchronous mode and in snapshot mode they are not sequential. In particular, DPA 112 may send an acknowledgement to protection agent 144 before receiving an acknowledgement back from DPA 124.

It is also noted in FIG. 4 that the steps performed by target side DPA 124 include two non-sequential groups; namely, (i) step 440, and (ii) steps 444 and 448.

Recovery mode is generally triggered as a result of a disaster at the source side. The source side data may become corrupt, or may not exist at all. In such case, after recovery is completed at the backup site, a user may perform a failover operation by switching the roles of the production site and backup site. The original backup site becomes a current production site, and the original production site becomes a current backup site. Alternatively, recovery mode can be triggered without a failover, in order to access data from a previous point in time.

While in recovery mode, target site DPA 124 continues to receive new write transactions from DPA 112 and enter them at the ends of the DO and DO METADATA streams. However, unlike production mode behavior, DPA 124 stops applying journal entries received from DPA 112 to LU B. Instead, DPA 124 uses the UNDO stream of the journal to rollback LU B, as described hereinabove.

During recovery, after or possibly before rollback of LU B is complete, a user may wish to access data from the target site. To this end, protection agent 164 stops failing I/O requests issued by host computer 160 and begins redirecting them to DPA 124. The processing of data by host computer 160 during recovery mode is referred to as "target side processing (TSP)".

To manage TSP write commands that are received by target side DPA 124, journal processor 180 preferably uses two additional data streams, referred to as TSP DO and TSP METADATA streams. When a TSP write command is received by DPA 124, it is entered at the end of the TSP DO stream and the end of the TSP DO METADATA stream. Since TSP writes relate to the state of LU B after the rollback is complete, the TSP DO stream writes are only applied to LU B after rollback is complete. Journal processor 180 applies TSP writes to LU B in a way similar to the way it applies write transactions deceiver from DPA 112; namely, journal processor 180 maintains the undo information for each write applied to LU B, in TSP UNDO and TSP UNDO METADATA streams.

When TSP read commands are received by target site DPA 124, DPA 124 returns the data to be read by identifying locations of the read command, and finding the most recent TSP write command or commands that were applied at these locations. The data is searched for (i) first in the TSP DO stream, and (ii) then in the journal UNDO data that was not yet applied to LU B and (iii) finally, if the data was not found in (i) and (ii), then the data is taken from LU B itself. Preferably, in order to perform such a search efficiently, DPA 124 generates and stores in its memory a virtual image of the UNDO METADATA storage locations by using an efficient data structure, such as a binary search tree.

After rollback is completed, the TSP writes that were performed during the rollback are applied to LU B, and DPA 124 begins applying TSP writes synchronously; i.e., TSP writes are applied to LU B when they are received by DPA 124, without keeping them in the TSP DO stream. As such, when a read command is received after rollback is complete, it is sent directly to LU B instead of being redirected through DPA 124.

Figure 5:
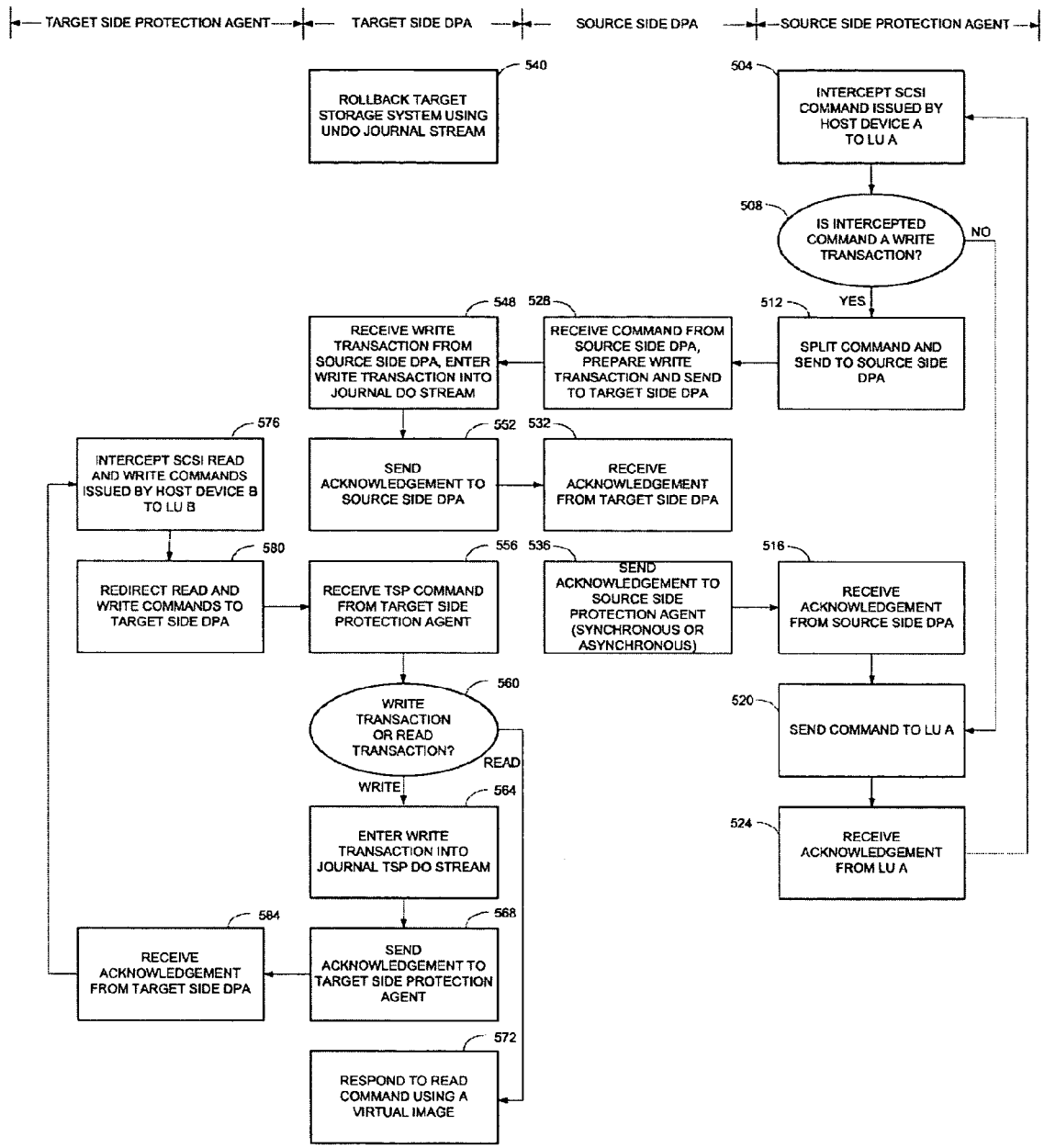
FIG. 5 is a simplified flowchart of a data protection method during a data recovery mode, prior to completion of rollback, in accordance with a preferred embodiment of the present invention.
Figure 6:
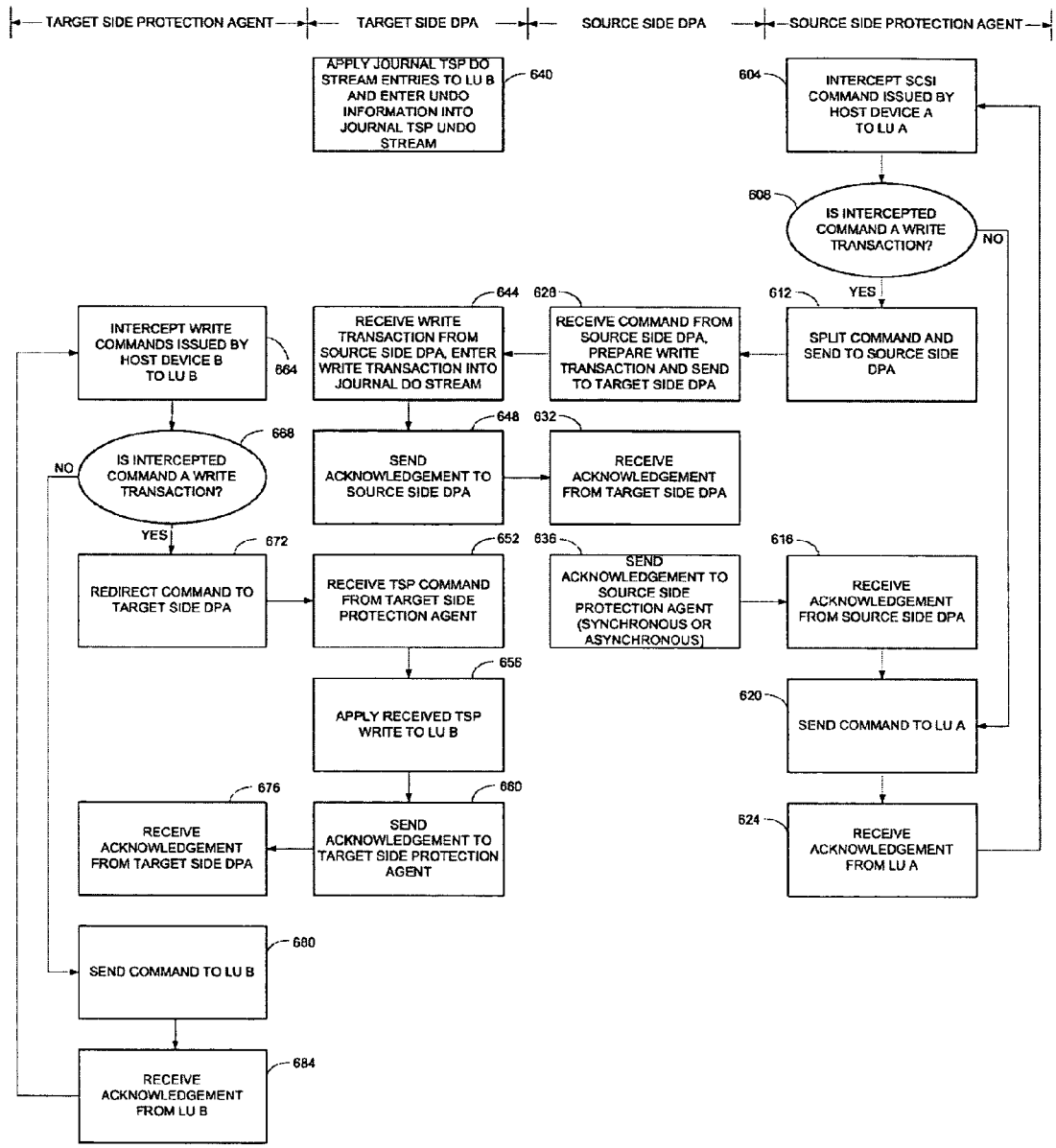
FIG. 6 is a simplified flowchart of a data protection method during a data recovery mode, after completion of rollback, in accordance with a preferred embodiment of the present invention.

TABLES V and VI below summarize the behavior of the special protection components of system 100 during recovery mode, before and after the rollback is complete, in accordance with a preferred embodiment of the present invention. Reference is also made to FIGS. 5 and 6, which are simplified flowcharts of data protection methods corresponding to TABLES V and VI, respectively. FIGS. 5 and 6 are divided into four columns. The leftmost column indicates steps performed by target side protection agent 164, the middle left column indicates steps performed by target side DPA 124, the middle right column indicates steps performed by source side DPA 112, and the rightmost column indicates steps performed by source side protection agent 144.

TABLE V

Recovery Functionality prior to Completion of Rollback

| System Component | Behavior |
| --- | --- |
| Target Side Agent 164 | Intercept SCSI commands issued to LU B (step 576). Redirect commands to DPA (step 580). |
| Target Side DPA 124 | Use UNDO stream of journal to roll back target storage system (step 540). Continue receiving write transactions from DPA 112 and enter these transactions into DO and DO METADATA streams without applying them to LU B (step 548). Enter TSP write transactions to TSP DO and TSP DO METADATA streams (step 564). Create a virtual image, to reply to read commands issued during the recovery process (step 572). |
| Source Side DPA 112 | As in production mode. |
| Source Side Agent 144 | As in production mode. |

TABLE VI

Recovery Functionality after Completion of Rollback

| System Component | Behavior |
| --- | --- |
| Target Side Agent 164 | Intercept SCSI commands issued to LU B (step 664). Redirect write transactions to DPA (step 672), and route read commands directly to LU B (step 680). |
| Target Side DPA 124 | Apply TSP write transactions to LU B, in the same manner that write transactions received from DPA 112 are applied in production mode; i.e., by entering data into TSP UNDO and TSP UNDO METADATA streams (step 640). Enter DO information and write transactions received from DPA 112 into DO and DO METADATA streams, without applying them to LU B (step 644). Apply TSP write transactions to LU B as they are received (step 656). |
| Source Side DPA 112 | As in production mode. |
| Source Side Agent 144 | As in production mode. |

It is also noted in FIG. 5 that the steps performed by target side DPA 124 include three non-sequential groups; namely, (i) step 540, (i) steps 548 and 552, and (iii) steps 556, 560, 564, 568 and 572. Similarly in FIG. 6 target side DPA performs three non-sequential groups of steps; namely, (i) step 640, (ii) steps 644 and 648, and (iii) steps 652, 656 and 660.

Figure 7:
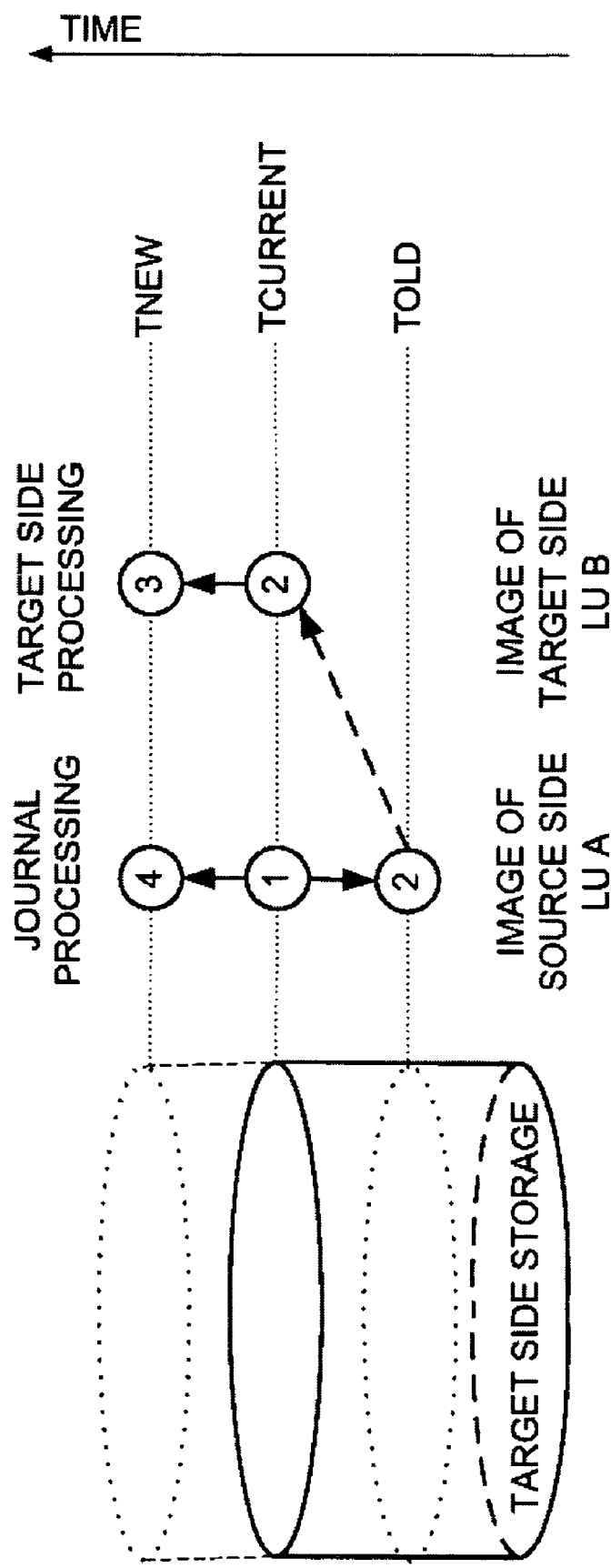
FIG. 7 is a simplified illustration of a time-line for tracking new processing of old data, in accordance with a preferred embodiment of the present invention.

Reference is now made to FIG. 7, which is a simplified illustration of a time-line for tracking new processing of old data, in accordance with a preferred embodiment of the present invention. FIG. 7 illustrates journal processor 180 bringing the timeline back to a previous time, TOLD, and journal processor 180 applying TSP writes to bring the timeline forward from time TCURRENT to time TNEW. As shown in FIG. 7, current data at time (1) is rolled back to old data at time (2). After rolling back the data to time (2), the rolled back data becomes the image upon which target side processing advances to new data at time (3); i.e., the target side processing is applied to data (2) and not to data (1).

The data at time (1) is a common image for LU A and LU B at the same point in time, TCURRENT. Similarly, the data at time (2) is a common image for LU A and LU B at time TOLD. Rolled back data at time (2) may be processed by TSP writes, while at the same time current data at time (1) is being processed by source side writes. As such, the data evolves along the path from time (2) to time (3) as it is processed by the target side, and along the path from time (2) to time (4) as it is processed by the source side. The data images at the source and target sides at time TNEW are thus different.

When the recovery process is completed, the user may (i) return to a normal production mode, or (ii) perform a failover by switching the replication direction. In case (i), LU B is rolled back to its state at time (2), and the write transactions along the path from (2) to (4) are applied to LU B, so as to bring LU B to the same image as LU A. Conversely, in case (ii), LU B is maintained at its state at time (3), and its data is copied from the target side to the source side so as to bring LU A to the same image as LU B.

It may be appreciated that after rolling back the UNDO data stream to LU B, the state of the target side storage is substantially identical to the state that LU A was in at an earlier point in time. However, after applying TSP writes, the state of LU B is then in a new state that is different from the earlier state of LU A. As such, in order to return to a normal production mode, and ensure that LU B is a copy of LU A, DPA 124 undoes the TSP writes that were written to LU B using the TSP undo stream, and then returns to its normal production mode and begins applying the data that was written into the DO stream. The DO stream includes all write transactions that were undone while LU B was rolled back. Additionally, the DO stream includes new journal entries that were received from DPA 112 while DPA was in recovery mode. Similarly, protection agent 164 returns to its production mode by beginning to fail I/O requests issued by host 116.

Alternatively, the user want to perform a failover; i.e., to make LU B in its current state a production LU and ensure that LU A is a copy of LU B. In this case the write transactions in the DO stream that correspond to a point in time subsequent to the recovered point in time are ignored. Additionally, the TSP writes that were applied to LU B during the recovery process are applied to LU A. Thereafter, the replication direction changes. Specifically, DPA 124 and protection agent 164 begin behaving in accordance with source site behavior, and DPA 112 and protection agent 144 begin behaving in accordance with target site behavior.

It may be appreciated that in order to provide failover capability, in which the roles of the production site and the backup site are switched, it is desirable that the source side has the necessary system components to function as a target side, and vice versa. Thus, in a preferred embodiment of the present invention, the source side includes its own journal LU 184 and journal processor 188, as indicated with dotted lines in FIG. 1.

In accordance with a preferred embodiment of the present invention, data protection is performed on "consistency groups". A consistency group is a basic logical unit of replication for "write order fidelity" maybe guaranteed. Write order fidelity refers to the ability to replicate data to a backup site and keep the data in the same sequence as it was written at the production site. For many applications, write order fidelity is a critical requirement for consistency. If data is written in an incorrect sequence at the backup site, such applications may become corrupted at that site.

In a preferred embodiment of the present invention, a consistency group includes a set of one or more logical units at a production site, a set of one or more host devices at the production site, and a DPA at the production site. Preferably, the consistency group also includes a replication site with a corresponding set of logical units that are used for replicating the source side logical units, a corresponding set of host devices and a corresponding DPA. Additionally, a consistency group also includes at least one journal LU, in which journal data for the consistency group is written. For example, with reference to FIG. 1, a consistency group may include host device A, LU A and DPA 112 at the production site, Device B, LU B and DPA 124 at the replication site, and journal LUs 176 and 184.

In a preferred embodiment of the present invention, write order fidelity is achieved within a consistency group by attaching a time stamp to every write transaction, as described hereinabove. Thus, with reference to FIG. 1, even if DPA 124 receives write transactions in an incorrect order, DPA 124 is able to re-order the write transactions based on their date & time stamps.

Large production systems may include multiple production sites and replication sites. An enterprise data system, for example, may be distributed across many host computers that write to different storage systems, through many switches. Typically, for such a complex SAN, there may not be a single node that receives all of the I/O operations.

Although complex SANs can be protected using multiple systems corresponding to FIG. 1, the need often arises to obtain a consistent image of all SAN targets at a certain point in time. For example, a database may be shared by two production sites, each with its own replication site, and the need may arise for a consistent image of the database across both sites.

Referring back to FIG. 1, in accordance with a preferred embodiment of the present invention, generating a consistent image maybe problematic when DPA 112 includes a cluster of computers, and when FC switch 148 connecting host computer 104 and storage system 108 includes more than one switch. As described hereinabove, use of a cluster of computers for a DPA serves to make a data protection system immune to failure of a DPA computer. Similarly, for the same reason of high-availability, more than one switch may connect host computer 104 and storage system 108.

When DPA 112 includes more than one computer, different write transactions may arrive at different DPA computers. In this case, there may be clock differences between the DPA computers that destroy write order fidelity. To avoid destroying write order fidelity, preferably a consistency group is always handled by one specific computer within a DPA cluster. When there are more than one consistency group handled by a DPA cluster, however, the workload can be shared amount the computers within the cluster. As such, the problem of generating a consistent image of more than one consistency group arises even if the consistency groups are handled by one DPA cluster.

Figure 8:
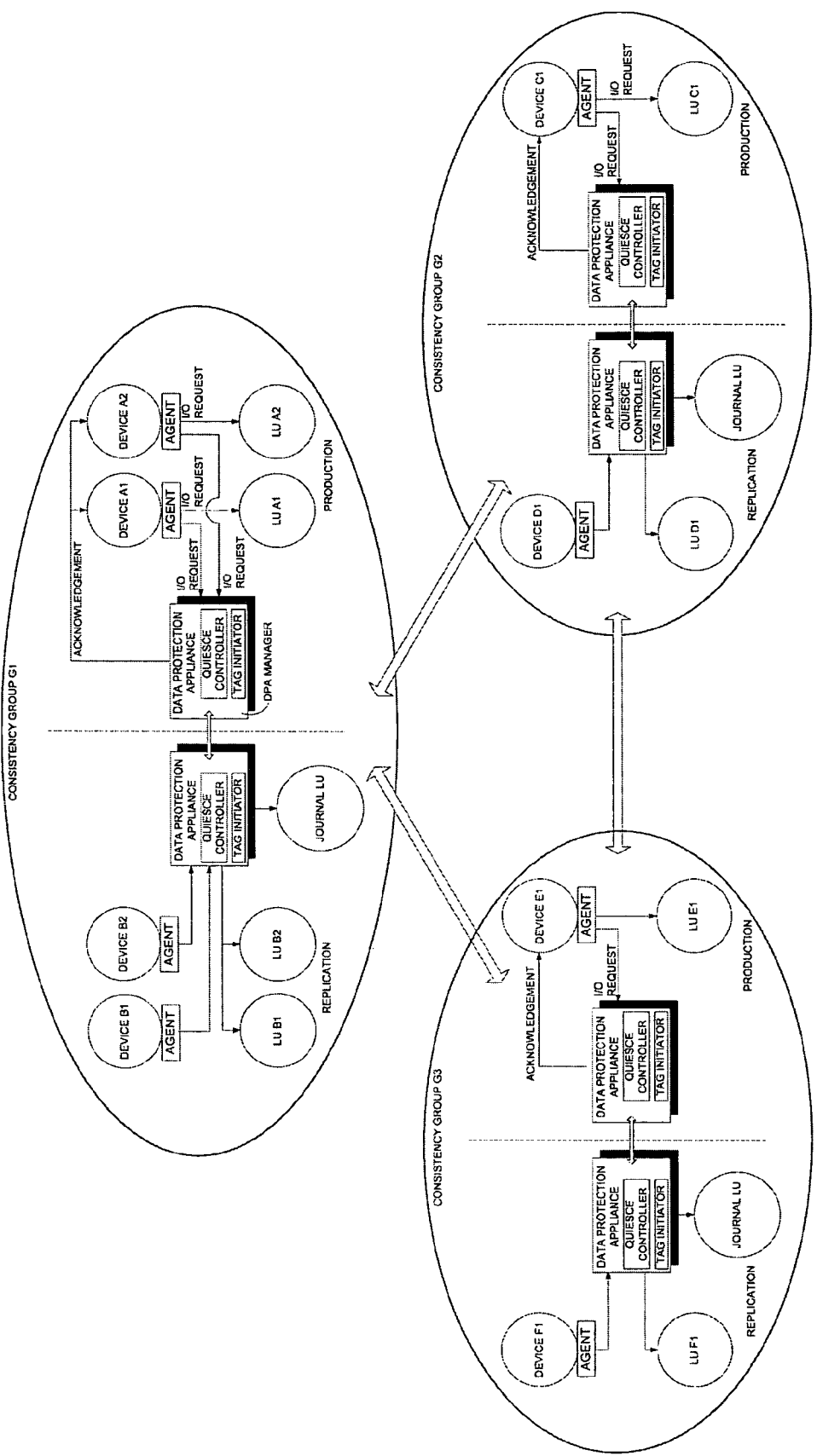
FIG. 8 is a simplified illustration of a system for cross-tagging consistency groups within a storage area network, for consistent data recovery, in accordance with a preferred embodiment of the present invention.

Reference is now made to FIG. 8, which is a simplified illustration of a system for cross-tagging consistency groups within a storage area network, for consistent data recovery, in accordance with a preferred embodiment of the present invention. Shown in FIG. 8 are three representative consistency groups, G1, G2 and G3. Group G1 includes two production logical storage units, LU A1 and LU A2, and two corresponding logical storage units, LU B1 and LU B2, for replication. Group G1 also includes internal host devices Device A1, Device A2, Device B1 and Device B2 corresponding to the logical storage units, and a pair of DPAs. Devices A1 and A2 are connected to corresponding protection agents, such as protection agent 144 of FIG. 1. In accordance with a preferred embodiment of the present invention, the DPAs include a tag initiator and a quiesce controller, the functions of which are described hereinbelow with reference to methods FIGS. 10 and 12. Group G2 includes a production logical storage unit, LU C1, and a corresponding logical storage unit, LU D1, for replication. Group G2 also includes internal host devices Device C1 and Device D1 corresponding to the logical storage units, and a pair of DPAs. Group G3 includes a production logical storage unit, LU E1, and a corresponding logical storage unit, LU F1, for replication. Group G3 also includes internal host devices Device E1 and Device F1 corresponding to the logical storage units, and a pair of DPAs. Devices C1, D1, E1 and F1 are connected to corresponding protection agents, and each DPA includes a tag initiator and a quiesce controller. The DPA of G1 is designated as the "DPA manager", the functionality of which is described hereinbelow with reference to method FIGS. 10 and 12.

In general, it may be appreciated that logical storage units from different consistency groups may be shared among host computers. For example, a single host computer may write to LU A1, LU B1, LU C1 and LU D1.

Referring back to FIG. 1, in accordance with a preferred embodiment of the present invention, DPA 112 may send a special write transaction, referred to as a "tag", to DPA 124, to mark a particular point in time. The tag may be initiated by a user of host computer 104, or by DPA 112 itself. The tag is written in the journal DO METADATA stream, similar to other write transactions, but it has a different type. Normal write transactions are marked as "data write" type, and tag transactions are marked as "tag write" type. As DO METADATA stream journal entries are processed and applied to storage 120, tags that are encountered are moved to the journal's UNDO METADATA stream. As such, when data recovery is performed to restore a tagged state, write transactions in the UNDO METADATA stream subsequent to the tag are undone.

Thus it may be appreciated that a user can use a tag to create a consistent snapshot at a given point in time, for a given consistency group. The user can give the tag a unique name that describes the point in time it is being applied. Subsequently, a backup facility can rollback the storage systems of a consistency group to that state they were in at the time of the tag. Referring to FIG. 8, LU A1 and LU A2, for example, can be rolled back to the states they were in at the time of a tag initiated by the DPA in G1.

With reference to FIG. 1, it may further be appreciated that DPA 112 has the ability to place Device A into a standby mode, by not sending an acknowledgement to host computer 104 for I/O requests sent through Device A. As described hereinabove, DPA 112 can hold I/O requests issued by host computer 104 through Device A in abeyance, by not sending an acknowledgement to protection agent 144. During such time period, an application running on host computer 104 and writing to LU A through Device A is quiesced; i.e., halted from issuing further I/O requests to storage system 108.

Preferably, as a safeguard, protection agent 144 is programmed to disconnect itself from DPA 112 and end the state of quiescence, after a certain timeout period has elapsed or after a certain event has occurred. Such disconnection ensures that the production site can continue its data processing, and not have to shut down in the interim; in case, for example, communication between DPA 112 and protection agent 144 becomes malfunctional. It may be appreciated that after such a disconnection, it is necessary to copy data that was written directly to LU A without being sent via DPA 112 to LU B, to re-synchronize LU A and LU B. Alternatively, protection agent 144 may be programmed to not connect itself, thereby ensuring that no data is written to LU A without being replicated to LU B.

In accordance with a preferred embodiment of the present invention, a consistent image of an entire SAN is accomplished by quiescing and cross-tagging all DPA clusters within the SAN, as described hereinbelow.

Figure 9:
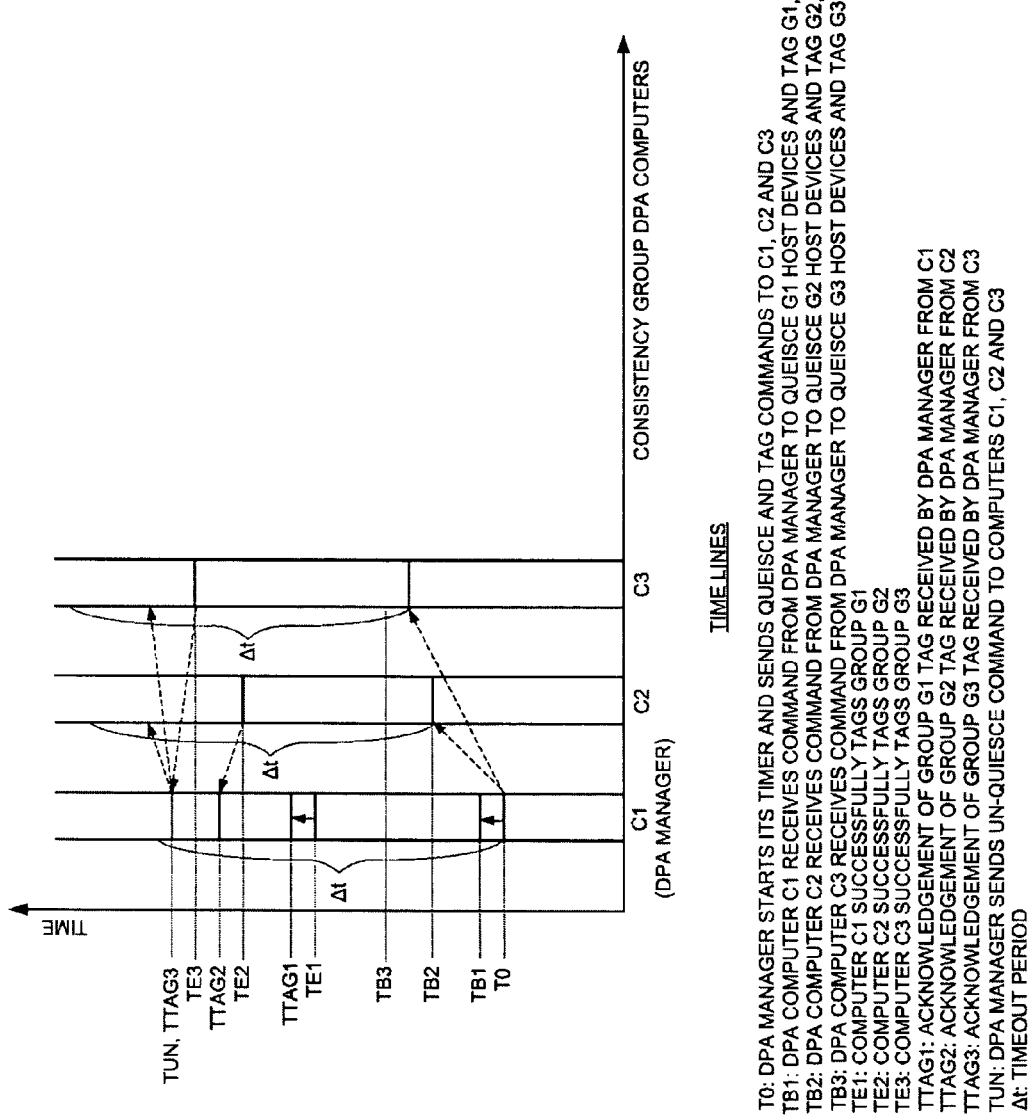
FIG. 9 is a simplified illustration of a time line for consistent cross-tagging, in accordance with a preferred embodiment of the present invention.
Figure 10:
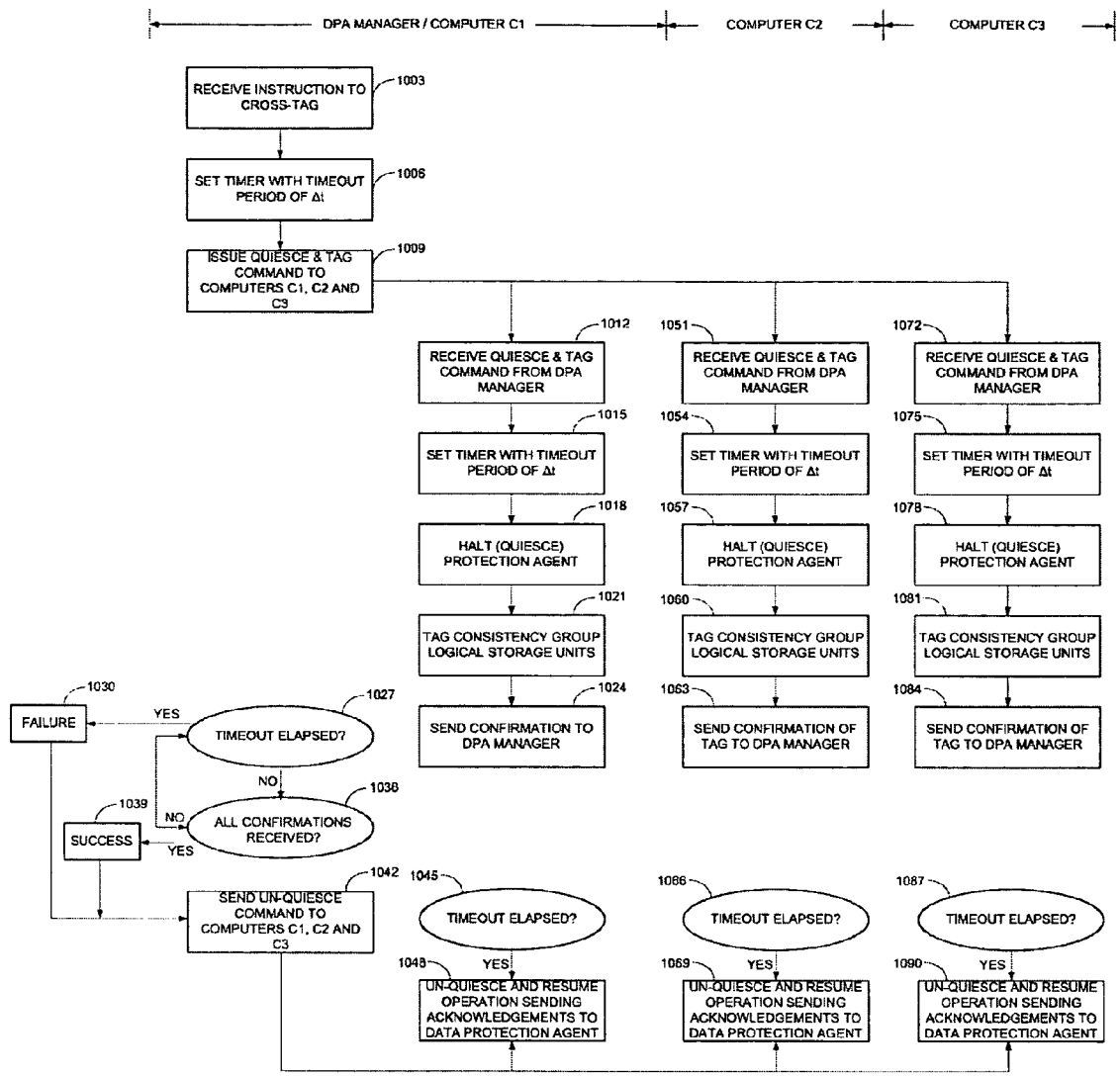
FIG. 10 is a simplified flowchart of a method for consistent cross tagging, in accordance with a preferred embodiment of the present invention.

Reference is now made to FIG. 9, which is a simplified illustration of a time line for consistent cross tagging, in accordance with a preferred embodiment of the present invention. Reference is also made to FIG. 10, which is a simplified flowchart of a method for consistent cross tagging, in accordance with a preferred embodiment of the present invention. Shown in FIG. 9 is a graph with a vertical time axis, and a horizontal axis for DPA computers within consistency groups.

FIGS. 9 and 10 refer to three DPA computers C1, C2 and C3, which together form a DPA cluster. Computers C1, C2 and C3 from the DPA cluster service three consistency groups, G1, G2 and G3, respectively. FIG. 10 is divided into four columns. The two leftmost columns describe steps performed by computer C1, the middle right column describes steps performed by computer C2, and the rightmost column describes steps performed by computer C3. The steps performed by computer C1 are preferably performed by two different processing threads, and are thus divided into two columns.

When a consistent image of G1, G2 and G3 is to be created, one of the DPA computers, referred to as the "DPA manager", say C1, receives a cross-tag instruction (step 1003). The DPA manager initiates a timer at a time T0, with an elapse time of T0+$\Delta$t (step 1006), and sends quiesce and tag commands to computers C1, C2 and C3 (step 1009). In accordance with a preferred embodiment of the present invention, the module that performs the quiesce and tag commands on C1 (steps 1012, 1015, 1018, 1021, 1024, 1045 and 1048) runs on a different processing thread than the module that issues the commands (steps 1003, 1006, 1009, 1027, 1030, 1036, 1039 and 1042). Thus, C1 actually receives the command from the DPA manager at a time TB1, somewhat later than T0 (step 1012). However, it will be appreciated by those skilled in the art that the module that performs the quiesce and tag command on C1 may also run on the same processing thread as the module that issues the command.

Each DPA computer that receives these commands (i) triggers a timer with a timeout value of $\Delta$t (steps 1015, 1054 and 1075), (ii) halts sending of acknowledgements to host devices associated with logical units that belong to the consistency group handled by the DPA computer (steps 1018, 1057 and 1078), and then (iii) initiates a tag (steps 1021, 1060 and 1081). If a DPA computer succeeds in performing (ii) and (iii) prior to elapse of the timeout $\Delta$t, it sends a confirmation to the DPA manager that the quiesce and tag commands were successful (steps 1024, 1063 and 1084). When the timeout interval $\Delta$t is exceeded (steps 1045, 1066 and 1087), or when an un-quiesce command is received from the DPA manager (step 1042), whichever comes first, the DPA computer stops halting the host devices and starts sending acknowledgements again (steps 1048, 1069 and 1090). Preferably, while the various host computers are quiesced, I/O requests that are delayed are kept in a buffer for later application.

C1 quiesces its own group G1 host devices, and tags the current state of the storage units in G1 at time TE1, as shown in FIG. 9 and at step 1021 of FIG. 10. C2 receives the command from the DPA manager at time TB2, and initiates a timer with an elapse time of TB2+$\Delta$t, quiesces host devices associated with logical units of G2, and tags the current state of the storage units in G2 at a time TE2, as shown in FIG. 9 and at step 1060 of FIG. 10. Similarly, C3 receives its quiesce and tag command at time TB3, quiesces the host devices associated with logical units of G3, and tags the current states of storage units in G3 at a time TE3, as shown in FIG. 9 and at step 1081 of FIG. 10. C1 finishes creating its tag, and sends a confirmation back to the DPA manager, which is received at time TTAG1 (step 1024). Similarly, C2 and C3 each finish creating their tags and send confirmations to the DPA manager (steps 1063 and 1084, respectively), which are received at times TTAG2 and TTAG3, respectively.

It can be seen from FIG. 9 that there exists a common time interval during which all host devices are quiesced if and only if the last of the tag times TE1, TE2 and TE3, occurs before the first of the un-quiesce times TB1+$\Delta$t, TB2+$\Delta$t and TB3+$\Delta$t. During the time interval between the last tag time and the first un-quiesce time all host devices are quiesced.

As shown in FIG. 9, if DPA manager receives the confirmations from the module performing the quiesce and tag command in C1, the DPA in G2 and the DPA in G3 within the timeout period $\Delta$t (steps 1027 and 1036), then, since the DPA manager's timer was set prior to the other DPA computers' timers, the DPA manager can be certain that at least during the time period between TTAG3 until the DPA manager's timeout elapses, all host devices associated with logical units of G1, G2 and G3 are quiesced. Thus, the DPA manager is certain that a consistent cross tagging across all consistency groups was successful (step 1039). Otherwise, the DPA manager cannot be certain that there was a single point in time after all three groups G1, G2 and G3 were tagged but before any of them were un-quiesced; i.e., it cannot ascertain that $$\max(TE1, TE2, TE3) < \min(TB1, TB2, TB3) + \Delta\Delta t. \quad (1)$$

Since the sequence of events ensures that T0<min(TB1, TB2, TB3), TE1<TTAG1, TE2<TTAG2 and TE3<TTAG3, a sufficient condition for Equation (1) to hold is that $$\max(TTAG1, TTAG2, TTAG3) < T0 + \Delta t. \quad (2)$$

Equation (2) is the condition illustrated in FIG. 9.

In order to rollback to a consistent image across all consistency groups, G1 should be rolled back to TTAG1, G2 should be rolled back to TTAG2, and G3 should be rolled back to TTAG3. The resulting image will be consistent across all consistency groups corresponding to the time TTAG3 at which the last confirmation was received. After rollback to times TTAG1, TTAG2 and TTAG3, and until such time that the first DPA computer is un-quiesced, all host devices associated with logical units of G1, G2 and G3 are quiesced, and the logical units of G1, G2 and G3 are rolled back to their states when the last write request was issued by the host devices.

Preferably, upon receiving confirmations from the DPA computers, the DPA manager sends an un-quiesce command to the DPA computers (step 1042), so as to minimize the time the DPA computers halt the application(s) writing to their consistency group host devices. Alternatively, if the DPA manager does not send such un-quiesce command, then each DPA computer will stop halting its respective consistency group host devices when its own timer elapses.

The method described hereinabove assumes that the timeout interval Δt is substantially identical, for all DPA computers; i.e., that the number of clocks within the timeout interval is substantially the same. Referring to FIGS. 9 and 10, this assumption uses the same timeout interval Δt for the DPA manager and for computers C1, C2 and C3 at respective steps 1006, 1015, 1054 and 1075. This assumption is generally true for small timeout intervals Δt. If this assumption is not justified, then an alternative embodiment of the present invention may be used instead, wherein the DPA manager waits until it receives a confirmation from the other DPA computers, without setting its own timer.

Upon receiving the last confirmation, the DPA manager cannot be certain that there was a time period in which all host devices associated with logical units of G1, G2 and G3 were quiesced. To resolve this, the DPA manager after receiving the last confirmation, sends an un-quiesce command to the DPA computers, as above. However, in this alternative embodiment each DPA computer that receives the un-quiesce command returns a true or false indicator, according to whether it was quiesced or un-quiesced when it received the DPA manager's un-quiesce command. If it was already un-quiesced, then its timeout period elapsed prior to receiving the DPA manager's un-quiesce command. If the DPA manager receives a return value of true from the DPA computers, it is certain that, at least at the point of time when it sent the un-quiesce command, all host devices associated with logical units of G1, G2 and G3 were quiesced, and thus the consistent cross-tagging succeeded. Otherwise, if it receives a return value of false from one or more DPA computers, then the consistent cross-tagging failed.

Although the alternative embodiment has the advantage that each DPA computer may have its own timeout period, and no assumption is made regarding the various DPA computer clocks, it has the disadvantage of requiring more time, and thus delaying the production site longer than the first embodiment. Thus if the cross-tag command is triggered, for example, by an external application, such as a database application, after the external application has performed its own quiesce command, then in the second embodiment such application has to halt its I/O requests until the other DPA computers report back to the DPA manager. In the first embodiment, such application only has to halt its I/O request until the DPA manager determines a success or a failure.

Figure 11:
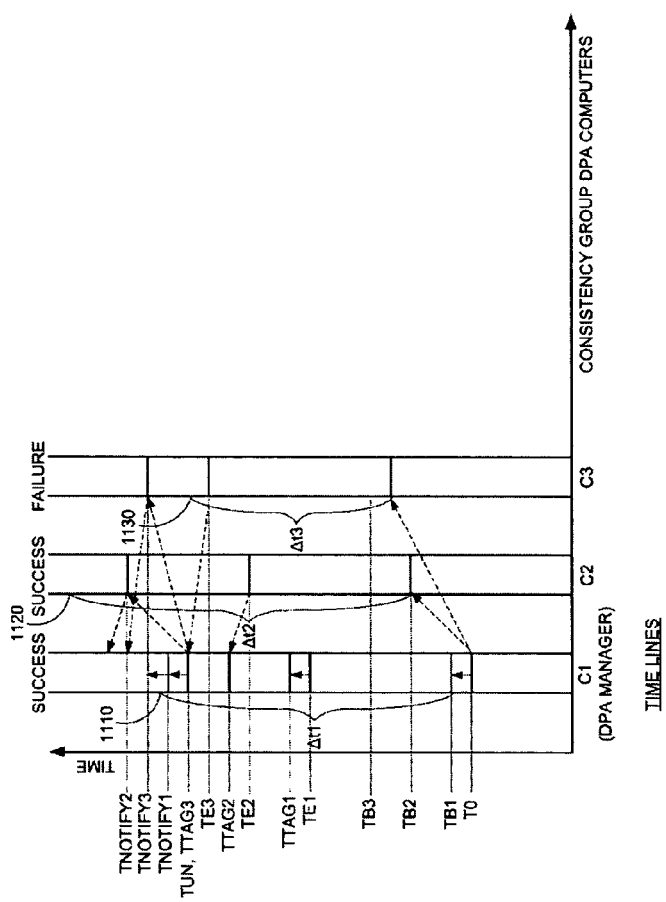
FIG. 11 is a simplified illustration of a time line for consistent cross-tagging, in accordance with an alternative embodiment of the present invention.
Figure 12:
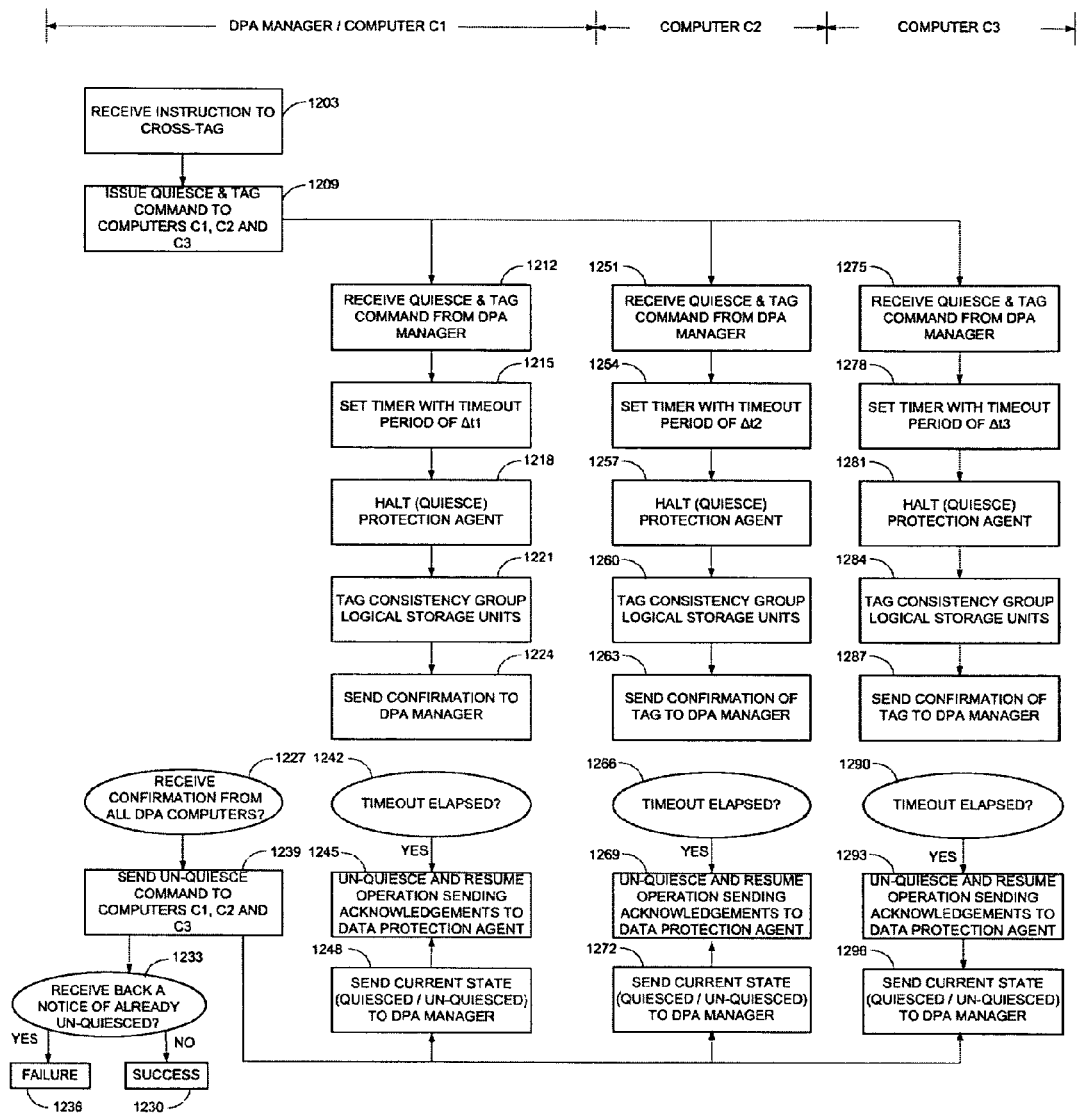
FIG. 12 is a simplified flowchart of a method for consistent cross tagging, in accordance with an alternative embodiment of the present invention.

Reference is now made to FIG. 11, which is a simplified illustration of a time line for consistent cross tagging, in accordance with a preferred embodiment of the present invention. Reference is also made to FIG. 12, which is a simplified flowchart of a method for consistent cross tagging, in accordance with a preferred embodiment of the present invention. Similar to FIG. 9, FIG. 11 also shows a graph with a vertical time axis, and a horizontal axis for DPA computers within consistency groups. Similar to FIG. 10, FIG. 12 is also divided into four columns; namely, the two leftmost columns describe steps performed by computer C1, the middle right column describes steps performed by computer C2, and the rightmost column describes steps performed by computer C3. The steps performed by computer C1 are preferably performed by two different processing threads, and are thus divided into two columns. In distinction to FIG. 10, however, the respective timeout periods Δt1, Δt2 and Δt3 at steps 1215, 1254 and 1278 may be different. Additionally, FIG. 12 includes different logic at steps 1227, 1230, 1233 and 1236 for determining success or failure of a consistent cross tag. Specifically, if all DPA computers send notifications to the DPA manager that they were quiesced when they received the DPA manager's un-quiesce command, then a consistent cross tag was obtained (step 1230). If any of the DPA computers sends a notification to the DPA manager that it was already un-quiesced when it received the DPA manager's un-quiesce command, then a consistent cross tag was not obtained (step 1236).

With reference to FIG. 11, if the respective notification times TNOTIFY1, TNOTIFY2 and TNOTIFY3 are each less than the timeout expirations 1110, 1120 and 1130, respectively, then a consistent cross tagging was obtained. Shown in FIG. 11 is a situation wherein computer C3, marked FAILURE, receives the un-quiesce command from the DPA manager after its timeout already expired at time 1130, and thus after it already un-quiesced its host devices. Computers C1 and C2, however, marked SUCCESS, each received the un-quiesce command from the DPA manager before its timeouts expired at time 1110 and 1120, respectively. In such case, a consistent cross tagging was not obtained, because the DPA manager cannot ascertain that there was a single point in time after all three groups G1, G2 and G3 were tagged but before any of them were un-quiesced; i.e., it cannot ascertain that $$\max(TE1, TE2, TE3) < \min(TB1+\Delta t1, TB2+\Delta t2, TB3+\Delta t3). \quad (3)$$

Since the sequence of events ensures that max(TE1, TE2, TE3)<min(TNOTIFY1, TNOTIFY2, TNOTIFY3), the conditions TNOTIFY1<TB1+Δt1, TNOTIFY2<TB2+Δt2 and TNOTIFY3<TB3+Δt3 suffice to guarantee that Equation (3) holds. These sufficient conditions are the conditions illustrated in FIG. 11.

In reading the above description, persons skilled in the art will realize that there are many apparent variations that can be applied to the methods and systems described. Thus it may be appreciated that the present invention applies to consistent cross tagging across multiple DPA clusters and, more generally, across multiple groups of host devices that write to logical storage units, each group having a mechanism for tagging a state of its logical storage units at specific point in time, and a mechanism for quiescing its host devices.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A system for consistent data recovery, comprising a storage area network (SAN) of initiator nodes and target nodes, wherein initiator nodes issue I/O requests and target nodes respond to I/O requests, the SAN being represented logically as a plurality of consistency groups of nodes, G1, . . . , Gn, each consistency group representing:
   (A) at least one logical storage unit (LU), each LU acting as a target node within the SAN;
   (B) at least one host device, each host device acting as an initiator within the SAN, each host device comprising
      (B.1) a transmitter for issuing I/O requests to at least one LU, and each host device being associated with (C) a host device agent, the host device agent comprising:
         (C.1) an interceptor for intercepting I/O requests issued by the host device and performing one or more of sending the intercepted I/O requests to the at least one LU, redirecting the intercepted I/O request to another LU, splitting the intercepted I/O requests to enable sending of the intercepted I/O requests first to a data protection agent prior to transmission to the at least one LU; and
         (C.2) a router for forwarding the intercepted I/O requests to the data protection appliance;
   (D) a data protection appliance (DPA) acting as both an initiator node and a target node within the SAN, the DPA comprising:
      (D.1) a receiver for receiving a current I/O request forwarded by an agent router for a host device;
      (D.2) a router for forwarding the current I/O request to a replication facility;
      (D.3) an ACK transmitter for sending an acknowledgement for an I/O request to an agent, wherein said agent router is operable to halt forwarding further host device I/O requests until the acknowledgement for a current I/O request is received from the DPA, and to resume forwarding after the acknowledgement for the current I/O request is received; and
      (D.4) a tag initiator for issuing an instruction for the replication facility to tag a consistency group at a current point in time; and
   (E) a replication facility comprising:
      (E.1) a receiver for receiving I/O requests forwarded by said DPA router; and
      (E.2) a data recoverer for restoring the LUs to a tagged state, based on I/O requests received by said DPA receiver, the system further comprising (F) a DPA manager operable to send requests to said DPAs of G1, . . . , Gn,
   (r1) to stop their ACK transmitters sending acknowledgements for I/O requests to said host device agents of G1, . . . , Gn, and
   (r2) to tag G1, . . . , Gn.

2. The system of claim 1 wherein said DPAs of G1, . . . , Gn are operable to send back confirmations to said DPA manager upon completion of said DPA manager's requests (r1) and (r2), and wherein said DPA manager, after receiving confirmations from said DPAs of G1, . . . , Gn, is operable to send a request to said DPAs of G1, . . . , Gn,
   (r3) to restart their ACK transmitters sending acknowledgements of I/O requests to said host device agents of G1, . . . , Gn.

3. The system of claim 2 wherein said DPA manager further comprises a timer for setting a time limit, and wherein said DPA manager is operable to report a cross-tagging success if said DPA manager receives confirmations from said DPAs of G1, . . . , Gn, within the time limit set by said DPA manager timer.

4. The system of claim 3 wherein each DPA further comprises a timer for setting a time limit, and wherein a DPA is operable to start its ACK transmitter sending acknowledgements of I/O requests to host device agents after the time limit set by said DPA timer has elapsed.

5. The system of claim 2 wherein each DPA of G1, . . . , Gn further comprises a timer for setting a time limit, and wherein each DPA of G1, . . . , Gn is operable to start sending acknowledgements of I/O requests to host devices after the time limit set by said DPA timer has elapsed, and wherein each DPA of G1, . . . , Gn is operable to send a notification to said DPA manager as to whether or not its ACK transmitter had already restarted sending acknowledgements when the DPA received the DPA manager's request (r3) to restart them.

6. The system of claim 1 wherein said DPA manager is operable to report a cross-tagging success if said DPA manager receiver receives notifications from said DPAs of G1, . . . , Gn that their ACK transmitters had not already restarted sending acknowledgements when they received the DPA manager's request (r3) to restart them.

7. The system of claim 1 wherein each of said host device agents of G1, . . . , Gn comprises a timer for setting a time limit, and wherein a host device agent router is operable to resume forwarding I/O requests after the time limit set by said host device agent timer has elapsed.

8. The system of claim 1 wherein a plurality of said DPAs are configured as a computer cluster.

9. A method for consistent data recovery, comprising issuing requests from a data protection appliance (DPA) manager to at least one DPA within at least one consistency group, G1, . . . , Gn,
   (r1) to stop sending acknowledgements of I/O requests to host device agents of G1, . . . , Gn, and
   (r2) to tag G1, . . . , Gn, wherein a tag is used to mark a consistency group at a specific point in time, wherein the consistency groups G1, . . . , Gn represent logical parts of a storage area network, and each consistency group G1, . . . , Gn represents a DPA, at least one host device, at least one LU and at least one replication facility, the replication facility being operable to restore the at least one LU to its former state at the time of the tag, and wherein each host device is associated with a host device controller that is operable to:
   forward the host device I/O requests;
   halt such forwarding when it does not receive an acknowledgement of a current I/O request from a DPA; and
   resume such forwarding after it does receive an acknowledgement of the current I/O request from the DPA.

10. The method of claim 9 further comprising performing, by each DPA of G1, . . . , Gn, the DPA manager's requests (r1) and (r2), said performing comprising:
   stop sending acknowledgements of I/O requests to the host device controllers of its consistency group; and
   tagging its consistency group.

11. The method of claim 10 further comprising:
sending, by each DPA of G1, . . . , Gn, a confirmation to the DPA manager after said performing the DPA manager's requests; and
issuing, by the DPA manager after the DPA manager receives confirmations from all DPAs of G1, . . . , Gn, requests to the DPAs of G1, . . . , Gn,
(r3) to restart sending acknowledgements of I/O requests to the host device controllers of G1, . . . , Gn.

12. The method of claim 11 further comprising:
setting a time limit, by the DPA manager; and
reporting, by the DPA manager, a cross-tagging success if the DPA manager receives confirmations from all DPAs of G1, . . . , Gn within the time limit set by the DPA manager.

13. The method of claim 12 further comprising setting, by each DPA, a time limit, and wherein each DPA restarts sending acknowledgments of I/O requests to host device controllers after the time limit set by the DPA has elapsed.

14. The method of claim 13 further comprising sending a notification, by each DPA of G1, . . . , Gn, to the DPA manager as to whether or not it had already restarted sending acknowledgements of I/O requests when it received the DPA manager's request (r3) to restart the sending.

15. The method of claim 14 further comprising reporting, by the DPA manager, a cross-tagging success if notifications are received from the DPAs of G1, . . . , Gn that they had not already restarted sending acknowledgements of I/O requests when they received the DPA manager's request (r3) to restart the sending.

16. The method of claim 10 further comprising restoring, by each replication facility, the LUs of its consistency group to their states at the time of said tagging by the DPA of its consistency group.

17. The method of claim 9 further comprising setting, by each host device controller, a time limit, wherein the host device controller resumes forwarding I/O requests after the time limit set by the host device agent has elapsed.

18. A computer-readable storage medium storing program code for causing a data protection appliance (DPA) manager to issue requests to at least one DPA within at least one other consistency group, G1, . . . , Gn,
(r1) to stop sending acknowledgements of I/O requests to host device agents of G1, . . . , Gn, and
(r2) to tag G1, . . . , Gn, wherein a tag is used to mark a consistency group at a specific point in time,
wherein the consistency groups G1, . . . , Gn represent logical parts of a storage area network, and each consistency group G1, . . . , Gn represents a DPA, at least one host device, at least one LU and at least one replication facility, the replication facility being operable to restore the at least one LU to its former state at the time of the tag, and wherein each host device is associated with a host device agent that is operable to:
forward the host device I/O requests;
halt such forwarding when it does not receive an acknowledgement of a current I/O request from a DPA; and
resume such forwarding after it does receive an acknowledgement of the current I/O request from the DPA.

19. A system for data protection, comprising a network represented logically as a plurality of consistency groups, G1, . . . , Gn, each consistency group representing:
at least one host device for issuing I/O requests, and each host device being associated with a host device controller for processing I/O requests issued by the host device; and
a data protection appliance (DPA), communicating with said at least one host device, comprising:
a quiesce controller operable to cause said at least one host device controller to halt processing I/O requests and to cause said at least one host device controller to resume processing I/O requests; and
a tag initiator for marking a specific consistency group at a specific point in time;
the system further comprising a DPA manager operable to send requests to said DPAs of G1, . . . , Gn,
(r1) via their quiesce controllers, to cause said host device controllers of G1, . . . , Gn to halt processing I/O requests, and
(r2) to initiate tags in G1, . . . , Gn.

20. The system of claim 19 wherein said DPAs of G1, . . . , Gn are operable to send back confirmations to said DPA manager upon completion of said DPA manager's requests (r1) and (r2).

21. The system of claim 20 wherein said DPA manager, after receiving confirmations from said DPAs of G1, . . . , Gn is operable to send a request to said DPAs from G1, . . . , Gn,
(r3) via their quiesce controllers, to cause said host device controllers of G1, . . . , Gn to resume processing I/O requests.

22. The system of claim 20 wherein said DPA manager further comprises a timer for setting a time limit, and wherein said DPA manager is operable to report a cross-tagging success if said DPA manager receives confirmations from said DPAs of G1, . . . , Gn, within the time limit set by said DPA manager timer.

23. The system of claim 22 wherein each DPA further comprises a timer for setting a time limit, and wherein said DPA quiesce controller is operable to cause a host device controller to resume processing I/O requests after the time limit set by said DPA timer has elapsed.

24. The system of claim 20 wherein each DPA of G1, . . . , Gn further comprises a timer for setting a time limit, and wherein each DPA quiesce controller is operable to cause its host device controllers to resume processing I/O requests after the time limit set by said DPA timer has elapsed.

25. The system of claim 24 wherein each DPA is further operable to send a notification to said DPA manager as to whether or not its quiesce controller had already caused its host controllers to resume processing I/O requests when said DPA receiver received said DPA manager's request (r3) to cause to resume.

26. The system of claim 25 wherein said DPA manager is operable to report a cross-tagging success if said DPA manager receives notifications from said DPAs of G1, . . . , Gn that their quiesce controllers had not already caused their host controllers to resume processing I/O requests when they received said DPA manager's request (r3).

27. The system of claim 19 wherein each of said host device controllers of G1, . . . , Gn comprises a timer for setting a time limit, and wherein a host device controller is operable to resume processing I/O requests after the time limit set by said host device controller timer has elapsed.

28. The system of claim 19 wherein a plurality of said DPAs are configured as a computer cluster.

29. The system of claim 19 wherein said host device controller halts processing I/O requests if said quiesce controller stops sending acknowledgements to said host device controller, and wherein said host device controller resumes processing I/O requests if said quiesce controller restarts sending acknowledgements to said host device controller.

30. The system of claim 19 wherein said host device controller halts processing I/O requests if said quiesce controller sends a halt instruction to said host device controller, and wherein said host device controller resumes processing I/O requests if said quiesce controller sends a resume instruction to said host device controller.

31. The system of claim 19 wherein the DPA manager is one of the DPAs of G1, . . . , Gn.

32. The system of claim 19 wherein the DPA manager is a separate appliance from G1, . . . , Gn.

33. A method for data protection, comprising issuing requests from a data protection appliance (DPA) manager, to at least one DPA within at least one consistency group, G1, . . . , Gn, the request comprising:
   (r1) to cause host device controllers of G1, . . . , Gn to halt processing I/O requests, and
   (r2) to initiate tags in G1, . . . , Gn, wherein a tag is used to mark a consistency group at a specific point in time,
wherein the consistency groups G1, . . . , Gn represent logical parts of a network, and each consistency group G1, . . . , Gn represents a DPA and at least one host device, and wherein each host device is associated with a host device controller that processes the host device I/O requests, and that can halt such processing and that can resume such processing.

34. The method of claim 33 further comprising performing, by each DPA of G1, . . . , Gn, the DPA manager's requests (r1) and (r2), said performing comprising:
   causing the host device controllers of its consistency group to halt processing I/O requests; and
   initiating a tag in its consistency group.

35. The method of claim 34 wherein said causing the host device controllers to halt processing I/O requests comprises stopping to send acknowledgements to the host device controllers.

36. The method of claim 34 wherein said causing the host device controllers to halt processing I/O requests comprises sending halt commands to the host device controllers.

37. The method of claim 34 further comprising sending, by each DPA of G1, . . . , Gn, a confirmation to the DPA manager after said performing the DPA manager's requests.

38. The method of claim 37 further comprising issuing, by the DPA manager after the DPA manager receives confirmations from all DPAs of G1, . . . , Gn, requests to the DPAs of G1, . . . , Gn,
   (r3) to cause the host device controllers within G1, . . . , Gn to resume processing I/O requests.

39. The method of claim 37 further comprising:
   setting a time limit, by the DPA manager; and
   reporting, by the DPA manager, a cross-tagging success if the DPA manager receives confirmations from all DPAs of G1, . . . , Gn within the time limit set by the DPA manager.

40. The method of claim 39 further comprising setting a time limit, by each DPA, and wherein the DPA causes a host device controller to resume processing I/O requests after the time limit set by the DPA has elapsed.

41. The method of claim 38 further comprising setting, by each DPA, a time limit, wherein the DPA causes a host device controller to resume processing I/O requests after the time limit set by the DPA has elapsed.

42. The method of claim 41 further comprising sending a notification, by each DPA of G1, . . . , Gn, to the DPA manager as to whether or not it had already caused its host device controllers to resume processing I/O requests when it received the DPA manager's request (r3) to cause them to resume.

43. The method of claim 42 further comprising reporting, by the DPA manager, a cross-tagging success if notifications are received from the DPAs of G2, . . . , Gn that they had not already caused their host device controllers to resume processing I/O requests when they received the DPA manager's request (r3) to cause them to resume.

44. The method of claim 33 further comprising setting, by each host device controller, a time limit, wherein the host device controller resumes processing I/O requests after the time limit set by the host device controller has elapsed.

45. A computer-readable storage medium storing program code for causing a data protection appliance (DPA) manager to issue requests to at least one DPA within at least one consistency group, G1, . . . , Gn, the requests comprising:
   (r1) to cause host device controllers of G1, . . . , Gn to halt processing I/O requests, and
   (r2) to initiate tags in G1, . . . , Gn, wherein a tag is used to mark a consistency group at a specific point in time,
wherein the consistency groups G1, . . . , Gn represent logical parts of a network, and each consistency group G1, . . . , Gn represents a DPA and at least one host device, and wherein each host device is associated with a host device controller that processes the host device I/O requests, and that can halt such processing and that can resume such processing.

46. A system for data recovery to a crash consistent state of data of a plurality of consistency groups stored in a storage sub-system, comprising:
   (A) a storage area network (SAN) of initiator nodes and target nodes, wherein initiator nodes issue I/O requests and target nodes respond to I/O requests, the SAN comprising:
      (A.1) at least one storage subsystem acting as a SAN target node, comprising:
         (A.1.1) at least one addressable physical storage unit; and
         (A.1.2) at least one controller operable to provide access to data stored in said at least one addressable physical storage unit, to at least one host acting as a SAN initiator node through at least one logical storage unit (LU), each LU having an identifier; and
      (A.2) at least one host acting as a SAN initiator node, operable to issue I/O requests to said at least one LU through at least one host device, each host device having an identifier;
   (B) at least one data processing unit, each data processing unit comprising:
      (B.1) a receiver for receiving I/O requests issued by at least one host to at least one LU;
      (B.2) a router for forwarding a current I/O request to a data protection facility; and
      (B.3) a transmitter for sending an acknowledgement for an I/O request to a host device of said at least one host, wherein each of said at least one host is operable to halt processing further I/O requests through a host device until the acknowledgement is received from the data processing unit for a current I/O request, and to resume processing I/O requests through a host device after the acknowledgement is received;
   (C) at least one consistency group, each consistency group being a logical entity comprising:
      (C.1) an identifier;
      (C.2) at least one of the LU identifiers; and
      (C.3) at least one of the host device identifiers;
   (D) a tag initiator for issuing an instruction for the data protection facility to store a consistency group identifier and a tag identifier; and
   (E) a data protection facility comprising:
      (E.1) a receiver for receiving I/O requests forwarded by said at least one router; and (E.2) a journal processor for storing write I/O requests issued to at least one LU, each write I/O request comprising an identifier of the LU to which the I/O request was issued and an identifier of the sequential order of the write request; and (E.3) a data recoverer for processing the data stored by said journal processor and the data stored in said at least one LU, or a copy thereof, so to enable at least one SAN initiator node to process the at least one LU, or a copy thereof, in a state it was in at least one point in time in the past, wherein one of the data processing units of the system further comprises (B.4) a data protection manager operable to send requests, via said transmitter, to at least one data processing unit, (r1) to halt host devices of at least one consistency group handled by that data processing unit, and (r2) to tag a consistency group.

* * * * *